United States Patent
Hirai

(10) Patent No.: US 10,235,741 B2
(45) Date of Patent: Mar. 19, 2019

(54) IMAGE CORRECTION APPARATUS AND IMAGE CORRECTION METHOD

(71) Applicant: FUJITSU LIMITED, Kawasaki-shi (JP)

(72) Inventor: Yukio Hirai, Akashi (JP)

(73) Assignee: FUJITSU LIMITED, Kawasaki (JP)

(*) Notice: Subject to any disclaimer, the term of this patent is extended or adjusted under 35 U.S.C. 154(b) by 100 days.

(21) Appl. No.: 15/435,857

(22) Filed: Feb. 17, 2017

(65) Prior Publication Data

US 2017/0249721 A1   Aug. 31, 2017

(30) Foreign Application Priority Data

Feb. 26, 2016  (JP) ................. 2016-036134

(51) Int. Cl.
  *G06K 9/40*   (2006.01)
  *G06T 5/00*   (2006.01)
  (Continued)

(52) U.S. Cl.
  CPC .............. *G06T 5/001* (2013.01); *G06T 5/003* (2013.01); *G06T 5/20* (2013.01); *G06T 5/40* (2013.01);
  (Continued)

(58) Field of Classification Search
  CPC ...... G06T 5/40; H04N 1/6027; H04N 1/4074; H04N 1/60; H04N 13/106; H04N 5/57; G06K 9/4661; G06K 9/2027
  See application file for complete search history.

(56) References Cited

U.S. PATENT DOCUMENTS 8,831,372 B2   9/2014  Akiyama
2005/0226526 A1*  10/2005  Mitsunaga ........... H04N 1/3935
                                                  382/274
(Continued)

FOREIGN PATENT DOCUMENTS

JP        5120414 *  4/2010  ............ H04N 5/243
JP        2012-85182  4/2012
(Continued)

OTHER PUBLICATIONS

Jobson et al.,"Properties and Performance of a Center/Surround Retinex", IEEE Transactions on Image Processing, vol. 6, No. 3, Mar. 1997, pp. 451-462.

*Primary Examiner* — Euengnan Yeh

(57) ABSTRACT

An image correction apparatus generates a reduced smoothed image by smoothing a reduced image created from an input image; detects at least one edge pixel on the reduced image or the reduced smoothed image; calculates, for each pixel of the reduced image, a reflectance component of an object; calculates a correction factor having a value based on a reflectance component in accordance with a distribution of reflectance components other than the reflectance component of the edge pixel; generates an enlarged smoothed image by enlarging the reduced smoothed image; and generates a corrected image by calculating a luminance value of each pixel of the corrected image based on the correction factor and the reflectance component based on a ratio of a luminance value of a corresponding pixel of the input image to a luminance value of a corresponding pixel of the enlarged smoothed image.

11 Claims, 17 Drawing Sheets

(51) Int. Cl.
*G06T 7/13* (2017.01)
*G06T 7/90* (2017.01)
*G06T 5/20* (2006.01)
*G06T 5/40* (2006.01)

(52) U.S. Cl.
CPC .................. *G06T 7/13* (2017.01); *G06T 7/90* (2017.01); *G06T 2207/10024* (2013.01); *G06T 2207/20192* (2013.01)

(56) References Cited

U.S. PATENT DOCUMENTS

| | | |
|---|---|---|
| 2010/0290714 A1 | 11/2010 | Toyoda et al. |
| 2013/0308834 A1* | 11/2013 | Suzuki ............... G06K 9/00912 382/115 |
| 2015/0123985 A1 | 5/2015 | Abe et al. |

FOREIGN PATENT DOCUMENTS

| | | |
|---|---|---|
| JP | 2013-210709 | 10/2013 |
| WO | 2009/107197 A1 | 9/2009 |

* cited by examiner

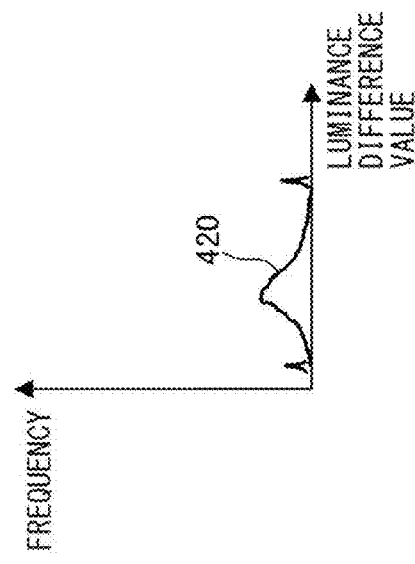
FIG. 4A
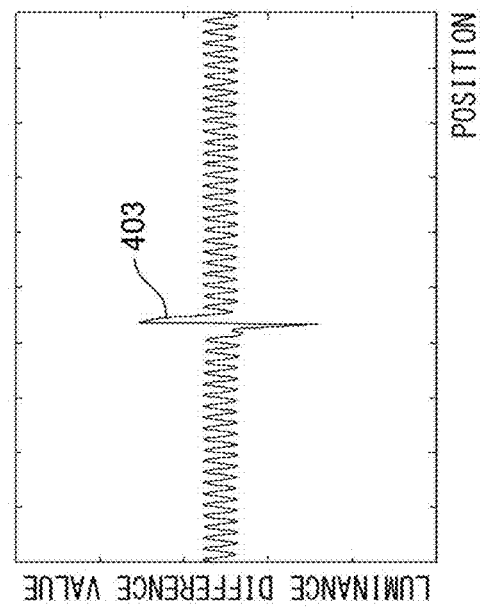
FIG. 4C
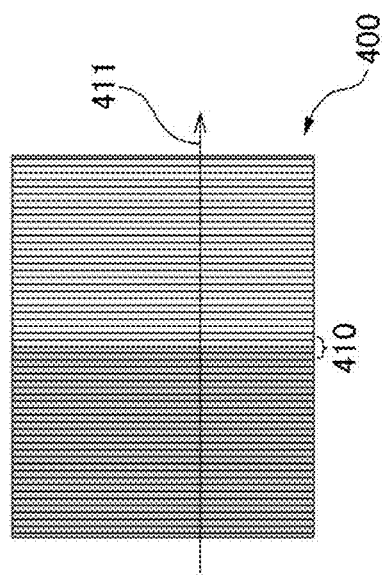
FIG. 4B
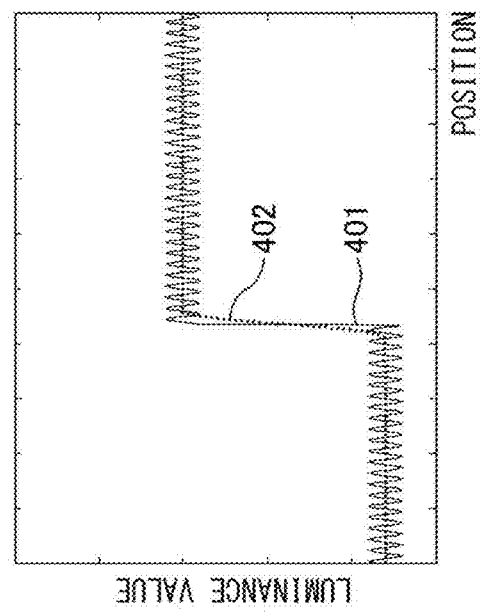

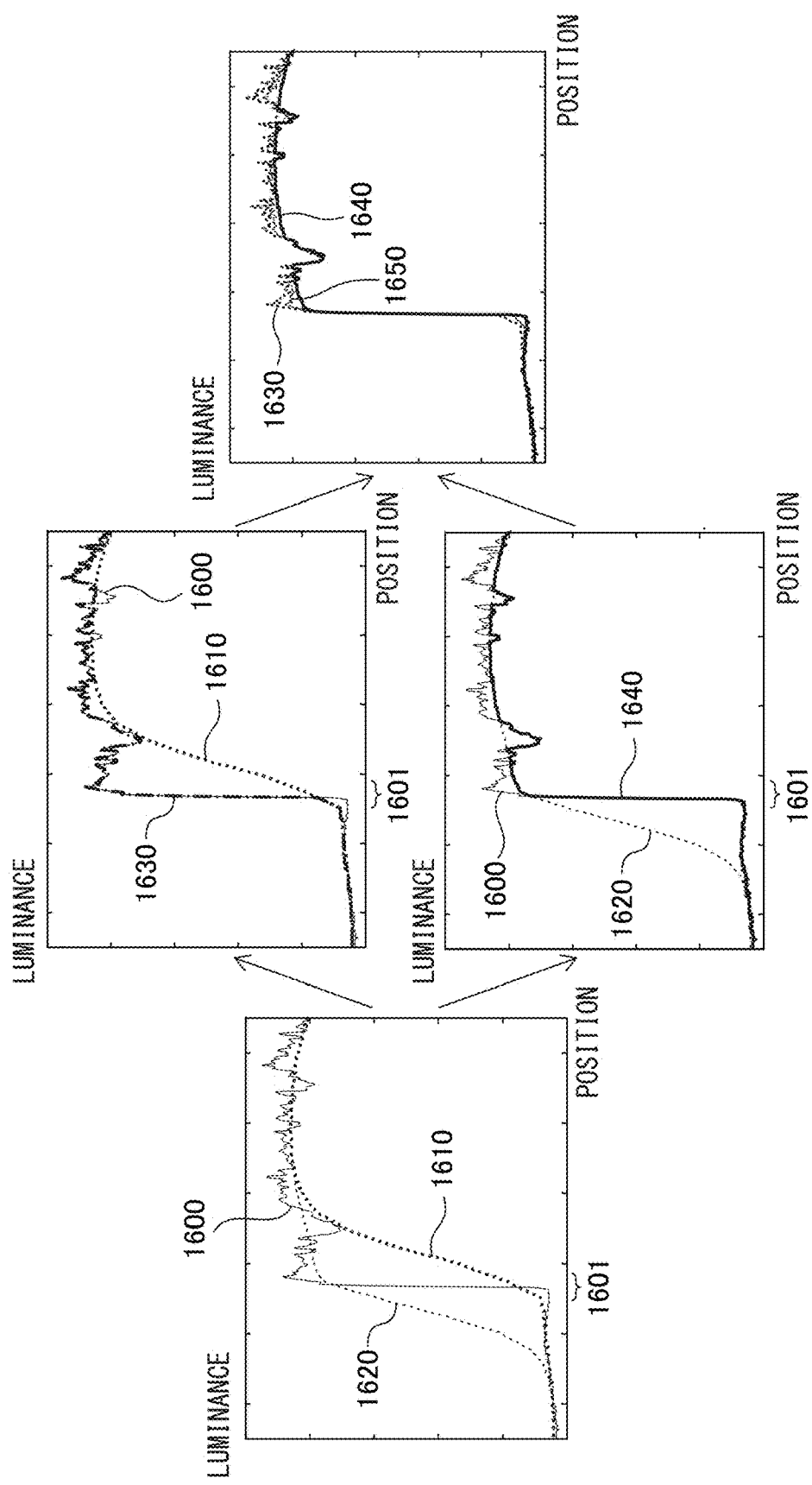

IMAGE CORRECTION APPARATUS AND IMAGE CORRECTION METHOD

CROSS-REFERENCE TO RELATED APPLICATION

This application is based upon and claims the benefit of priority of the prior Japanese Patent Application No. 2016-036134, filed on Feb. 26, 2016, and the entire contents of which are incorporated herein by reference.

FIELD

The embodiments discussed herein are related to an image correction apparatus and an image correction method for correcting the contrast of an object captured in an image.

BACKGROUND

When photographing an object, the object may be partially illuminated and partially shadowed. In such a case, a situation may occur in which on the resultant image, the difference in luminance between the illuminated part and the shadowed part of the object is so significant that it is difficult to identify either of the parts. Therefore, there has been proposed a technique in which it is possible to improve the contrast of an object by compressing a dynamic range according to the Retinex theory (for example, refer to D. J. Jobson, et al., "Properties and Performance of a Center/Surround Retinex", IEEE Trans. On Image Processing, Vol. 6, No. 3, March 1997).

The Retinex theory is based on an assumption that the human visual system perceives an object based on a reflectance distribution on the surface of the object which is obtained by eliminating an illuminance distribution of illumination light from a distribution of reflected light from the object rather than a distribution of the reflected light. Thus, in the Retinex theory, it is assumed that the following equation holds:

$$I(x,y)=R(x,y)L(x,y)$$

wherein $I(x,y)$ is a luminance value of a pixel $(x,y)$ of the original image, $R(x,y)$ is a reflectance of an object captured at the pixel $(x,y)$ in the original image, and $L(x,y)$ is an illuminance of illumination light at the pixel $(x,y)$.

In this regard, as the illuminance distribution L of illumination light, for example, a smoothed image is used which is obtained by applying a low-pass filter such as a Gaussian filter to the original image. Further, the reflectance $R(x,y)$ of each pixel is determined, for example, by performing calculation of $R(x,y)=I(x,y)/L(x,y)$, and a corrected image is obtained by multiplying the reflectance $R(x,y)$ of each pixel by a constant k (wherein k>1).

When the image includes an edge portion in which the illuminance of illumination light changes abruptly, in order to accurately estimate the illuminance distribution L of the illumination light, it is preferable that a smoothing process is performed with respect to the image such that the edge portion is preserved. When the edge portion is not preserved, a discrepancy may occur between the actual illuminance distribution L of the illumination light and the smoothed image in the edge portion, thus an artifact may occur in the corrected image.

Further, in recent years, due to the development of high-definition image sensors, images with a very large number of pixels have been used. Also with videos, moving images in which the number of pixels per frame is large, such as so-called 4k, are becoming to be used. Therefore, the amount of calculation can preferably be reduced when image correction is performed.

Accordingly, there has been proposed a technique for obtaining, with a small amount of calculation, an illumination light component image in which an artifact does not occur in a gradation correction result (for example, refer to Japanese Laid-open Patent Publication No. 2012-85182). The image processing apparatus disclosed in Japanese Laid-open Patent Publication No. 2012-85182 performs a smoothing process in a state in which an edge is preserved in a reduced image obtained by reducing an input image, and thereby enlarges the resultant image in a state in which the edge is preserved. The image processing apparatus performs, during the enlargement, a filtering process that interpolates pixels and determines a pixel value of an interest pixel, which is a target for the filtering process, based on a weighted addition of pixel values of respective reference pixels. Further, the image processing apparatus sets a weighting factor for the pixel value of each reference pixel based on the difference between the pixel value of the input image corresponding to the interest pixel and the pixel value of each reference pixel and the distance between the interest pixel and each reference pixel after the enlargement.

SUMMARY

The technique disclosed in Japanese Laid-open Patent Publication No. 2012-85182 reduces the amount of calculation by obtaining the smoothed image using the reduced image. However, since a process other than the process for calculating a smoothed image is included in the image correction process based on the Retinex theory, the amount of calculation may be preferably reduced also for the process other than the process for calculating the smoothed image in order to further reduce the amount of calculation for the entire image correction process.

According to an embodiment, an image correction apparatus is provided. The image correction apparatus includes a processor configured to:

generate a reduced image having a smaller number of pixels than an input image;

generate a reduced smoothed image by smoothing the reduced image;

detect at least one edge pixel having an edge strength greater than or equal to a predetermined value on the reduced image or the reduced smoothed image;

calculate, for each pixel of the reduced image, a reflectance component of an object based on a ratio of a luminance value of the pixel to a luminance value of a corresponding pixel of the reduced smoothed image;

calculate a correction factor having a value based on a value of the reflectance component in accordance with a distribution of the reflectance components other than the reflectance component of the at least one edge pixel;

generate an enlarged smoothed image having the same number of pixels as the input image by enlarging the reduced smoothed image; and generate a corrected image by calculating for each pixel of the corrected image, a luminance value of the each pixel based on the correction factor and the reflectance component based on a ratio of a luminance value of a corresponding pixel of the input image to a luminance value of a corresponding pixel of the enlarged smoothed image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A illustrates an example of a profile of luminance values of a reduced image and a reduced smoothed image.

FIG. 4B illustrates an example of a profile of a luminance difference value between corresponding pixels of the reduced image and a reduced smoothed image.

FIG. 4C illustrates a histogram of the luminance difference value, which corresponds to the profile of the luminance difference value illustrated in FIG. 4B.

FIG. 16 is a conceptual diagram of a process for generating an enlarged smoothed image using the positive-side limiting smoothed image and the negative-side limiting smoothed image.

DESCRIPTION OF EMBODIMENTS

Figure 1:
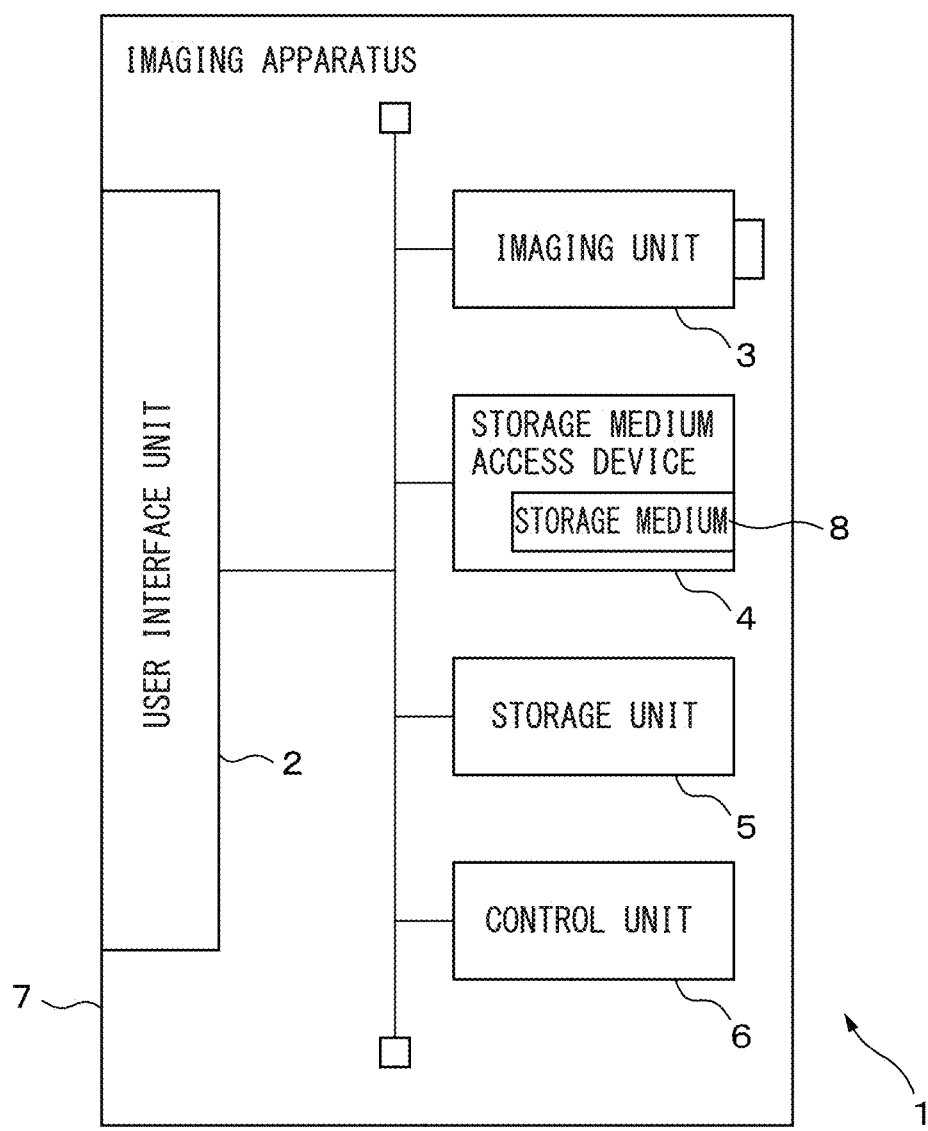
FIG. 1 is a hardware configuration diagram of an imaging apparatus incorporating an image correction apparatus according to an embodiment.

Hereinafter, referring to the drawings, description will be made of an image correction apparatus. The image correction apparatus generates a reduced image obtained by reducing an original image, when generating a smoothed image representing an illuminance distribution of illumination light in the Retinex theory. Further, the image correction apparatus not only generates the smoothed image but also calculates a correction factor using the reduced image to achieve reduction of an amount of calculation. In other words, the image correction apparatus calculates, as a reflectance component of an object, a logarithmic luminance difference value between corresponding pixels of the reduced image and a reduced smoothed image obtained by smoothing the reduced image per se, and calculates the correction factor on the basis of a histogram representing a frequency distribution of the reflectance component of the object. In this regard, in order to suppress influence on the correction factor by an artifact such as due to an edge portion of the illuminance distribution of illumination light, the image correction apparatus detects a pixel corresponding to the edge portion and creates a histogram excluding the reflectance component of the object in the detected pixel.

FIG. 1 is a hardware configuration diagram of an imaging apparatus incorporating the image correction apparatus according to an embodiment. An imaging apparatus 1 includes a user interface unit 2, an imaging unit 3, a storage medium access device 4, a storage unit 5, and a control unit 6. The user interface unit 2, the imaging unit 3, the storage medium access device 4, the storage unit 5, and the control unit 6 are disposed in a housing 7. The imaging apparatus 1 may be a cellular phone, a portable information terminal, a digital camera, or a tablet type computer. Further, the imaging apparatus 1 may include a communication interface circuit (not illustrated) for connecting the imaging apparatus 1 to other equipment. It should be noted that FIG. 1 is a view for explaining the components of the imaging apparatus 1 and does not illustrate the actual arrangement of the respective components of the imaging apparatus 1.

The user interface unit 2 includes, for example, a liquid crystal display or an organic electroluminescent display and is disposed in a manner such that the display screen of the user interface unit 2 is directed toward the user who faces the front face of the housing 7. Further, the user interface unit 2 displays to the user various information such as the image generated by the imaging unit 3 or the like. Further, the user interface unit 2 may include a plurality of operation buttons for enabling the user to perform operations with respect to the imaging apparatus 1. Alternatively, the user interface 2 unit may include a touch panel display. In this instance, the user interface unit 2 displays, for example, various icons or operation buttons in accordance with a control signal from the control unit 6. When the user touches the position of the displayed icon or operation button, the user interface unit 2 generates an operation signal corresponding to the position, and outputs the operation signal to the control unit 6.

The imaging unit 3 includes an image sensor including solid-state imaging elements arranged in a two-dimensional array form and an imaging optical system that forms an image of an object on the image sensor.

The imaging unit 3 images an object in response to operation by the user and generates an image in which the object is captured. In the present embodiment, the imaging unit 3 generates a color image represented by an RGB color system. Further, the imaging unit 3 outputs, each time it generates an image, the generated image to the control unit 6.

The storage medium access device 4 is a device that accesses a storage medium 8 such, for example, as a semiconductor memory card. The storage medium access device 4 reads a computer program stored, for example, on the storage medium 8, which to be executed on the control unit 6, and passes it to the control unit 6. Further, as described below, when the control unit 6 executes a computer program that realizes the function as the image correction apparatus, the storage medium access device 4 may read the image-correcting computer program from the storage medium 8 and pass it to the control unit 6.

The storage unit 5 includes, for example, a non-volatile semiconductor memory that is capable of being read and written to and a volatile semiconductor memory that is capable of being read and written to. The storage unit 5 stores various application programs executed on the control unit 6 and various data. Further, the storage unit 5 stores an image to be corrected, a corrected image generated from execution of the image correction process, and various data usable with the image correction process or various data generated in the course of the image correction process.

The control unit 6 includes one or more processors and peripheral circuits thereof. The control unit 6 is connected via a signal line to each unit of the imaging apparatus 1 and controls the entire imaging apparatus 1. Further, the control unit 6 operates as the image correction apparatus and performs the image correction process with respect to the image received from the imaging unit 3.

Figure 2:
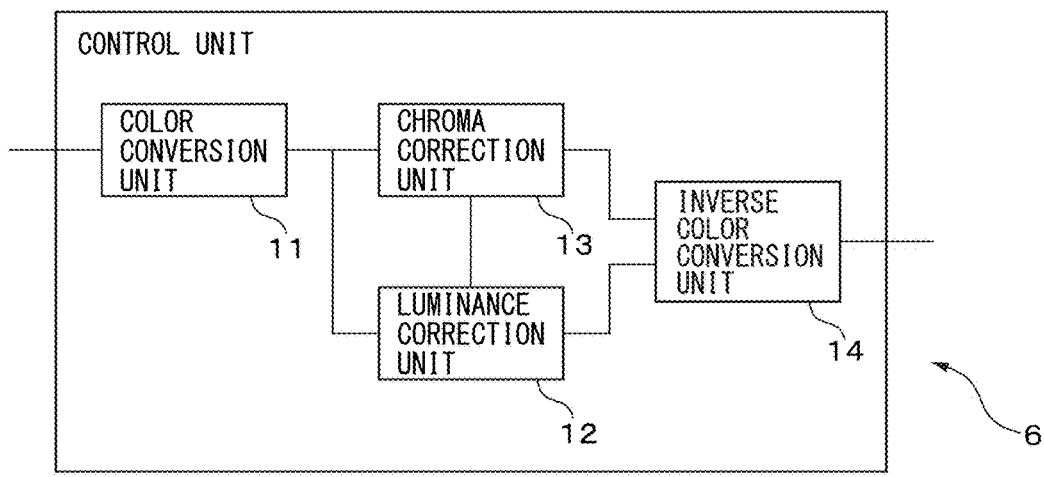
FIG. 2 is a functional block diagram of a control unit relating to image correction process.

FIG. 2 is a functional block diagram of the control unit 6 relating to image correction process. The control unit 6 includes a color conversion unit 11, a luminance correction unit 12, a chroma correction unit 13, and an inverse color conversion unit 14. The respective units included in the control unit 6 are realized, for example, by a computer program executed on the control unit 6. These respective units included in the control unit 6 may be implemented in the imaging apparatus 1 in a form of one or more integrated circuits that realize the functions of the these respective units, separately from a processor included in the control unit 6.

In the below description, an image obtained by applying the image correction process will be referred to as an original image.

The color conversion unit 11 performs, for each pixel of the original image, a conversion from a value represented by the RGB color system to a value represented by the YUV color system. Further, the color conversion unit 11 outputs a luminance image in which each pixel has only a luminance component (i.e., Y component) among the luminance component and color difference components to the luminance correction unit 12, and outputs a color difference image in which each pixel has only color difference components (i.e., U component and V component) among the luminance component and color difference components to the chroma correction unit 13.

The luminance correction unit 12 corrects the luminance value of each pixel of the luminance image, for example, according to the Retinex theory, and generates a luminance-corrected image. In this manner, the contrast of the object on the luminance-corrected image is enhanced. Then, the luminance correction unit 12 outputs the luminance-corrected image to the inverse color conversion unit 14. Further, the luminance correction unit 12 outputs, for each pixel of the luminance-corrected image, a luminance correction factor $\gamma$ to the chroma correction unit 13 which is a ratio of the luminance value after the correction to the luminance value of the corresponding pixel of the luminance image before the correction. The details of the process by the luminance correction unit 12 will be described hereinafter.

The chroma correction unit 13 corrects the color difference components of each pixel of the image based on the luminance correction factor $\gamma$ for the same pixel. For example, the chroma correction unit 13 corrects the color difference components of each pixel of the image in accordance the following equation:

$$U' = \alpha(\gamma)(U-\beta)+\beta$$

$$V' = \alpha(\gamma)(V-\beta)+\beta$$

wherein U and V are the values of the U and V components before the correction, respectively, and U' and V' are the values of the U and V components after the correction, respectively. $\beta$ is a constant, and, for example, is set to 128 when the U component and the V component are represented by 0 to 255. $\alpha(\gamma)$ is a correction factor that is set based on the luminance correction factor $\gamma$ and may be, for example, a monotonically increasing function which is linear with an increase in the luminance correction factor $\gamma$ or a monotonically increasing function of which increase rate is gentler as the luminance correction factor $\gamma$ increases, such as a sigmoid function.

The chroma correction unit 13 outputs the value of each pixel of the corrected color difference image to the inverse color conversion unit 14.

The inverse color conversion unit 14 converts, for each pixel of the luminance-corrected image, from a value of the YUV color system represented by the luminance value of the pixel and the color difference components of the corresponding pixel of the corrected color difference image to a value represented by the RGB color system. In this manner, a corrected image is obtained.

Figure 3:
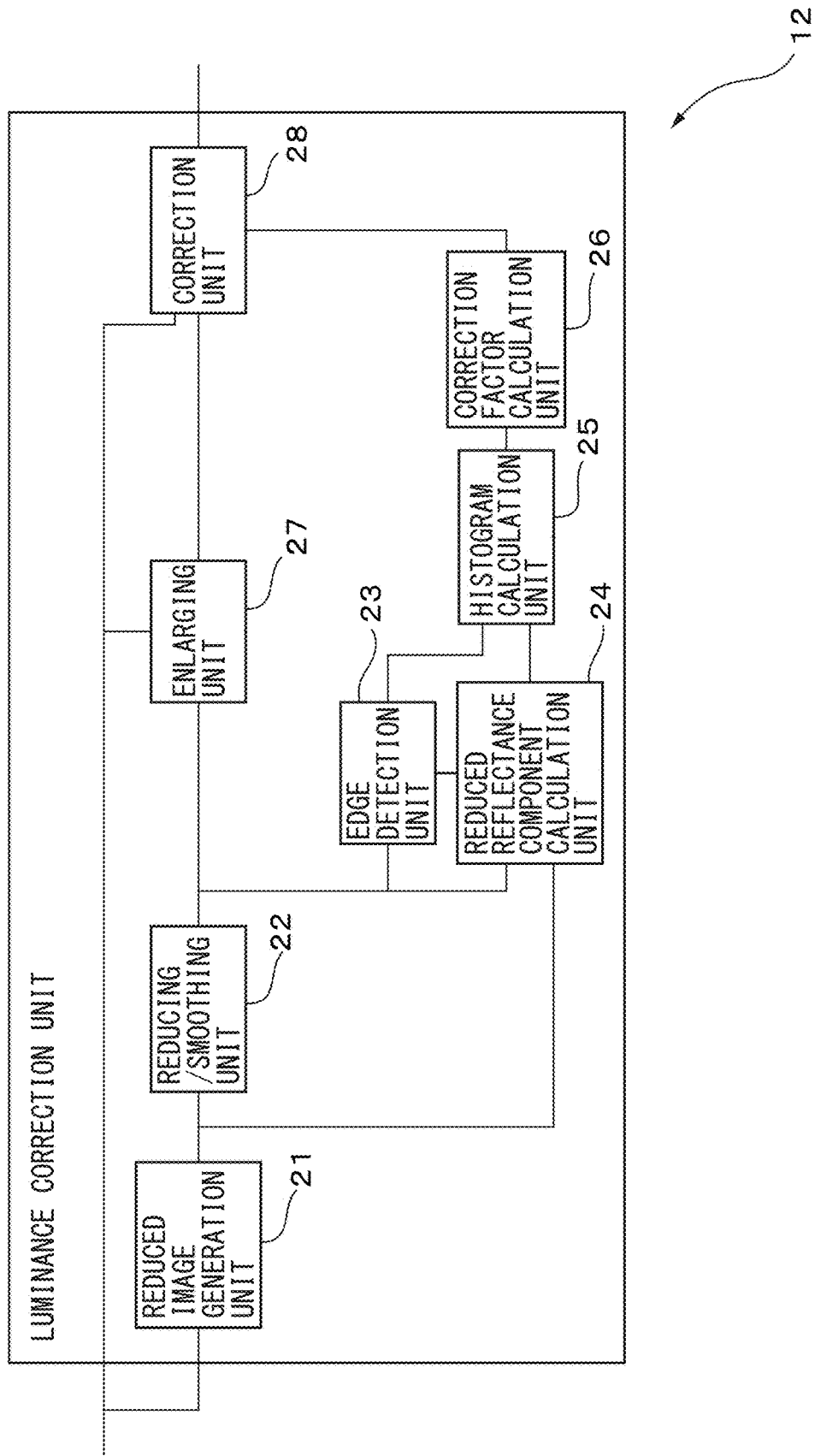
FIG. 3 is a functional block diagram of a luminance correction unit.

Hereinafter, description will be made of the details of the luminance correction unit 12. FIG. 3 is a functional block diagram of the luminance correction unit 12. The luminance correction unit 12 includes a reduced image generation unit 21, a reducing/smoothing unit 22, an edge detection unit 23, a reduced reflectance component calculation unit 24, a histogram calculation unit 25, a correction factor calculation unit 26, an enlarging unit 27, and a correction unit 28.

The reduced image generation unit 21 generates a reduced image with a smaller number of pixels than the number of pixels of the luminance image. For example, the reduced image generation unit 21, in the luminance image, calculates an average of the luminance value of each set of adjacent vertical 2×horizontal 2 pixels, and sets the average as a luminance value of one pixel corresponding to the set. In this manner, an intermediate reduced image is obtained in which the number of pixels is ½ of that of the original luminance image for the vertical direction and the horizontal direction. The reduced image generation unit 21 generates a reduced image by repeating a similar process with respect to the obtained intermediate reduced image by a number of times corresponding to a predetermined reduction ratio (e.g., 1 to 5 times).

Alternatively, the reduced image generation unit 21 may generate a reduced image by sampling pixels from the luminance image at a sampling rate corresponding to the predetermined reduction ratio for the vertical direction and the horizontal direction. The reduction ratio is set, for example, based on the number of pixels in the original image and the arithmetic capacity of the control unit 6, and, for example, is ¼ to ¹⁄₁₆. The reduced image generation unit 21 outputs the obtained reduced image to the reducing/smoothing unit 22 and the reduced reflectance component calculation unit 24.

The reducing/smoothing unit 22 generates a reduced smoothed image by smoothing the reduced image. For example, the reducing/smoothing unit 22 generates the reduced smoothed image by performing, for each pixel of the reduced image, a smoothing filter process such as moving average filtering, median filtering, Gaussian filtering, or ε-filtering. Then, the reducing/smoothing unit 22 outputs the reduced smoothed image thus generated to the edge detection unit 23, the reduced reflectance component calculation unit 24, and the enlarging unit 27.

The edge detection unit 23 detects, based on the reduced smoothed image, an edge pixel which is a pixel included in an edge portion caused by the illuminance distribution of illumination light or the like. Description will now be made of an artifact at the edge portion which results from a difference between the reduced image and the reduced smoothed image.

FIG. 4A illustrates an example of a profile of luminance values of the reduced image and the reduced smoothed image. In FIG. 4A, the horizontal axis indicates position, and the vertical axis indicates luminance value. A profile 401 represents a change in the luminance value of a pixel row 411 in a direction traversing an edge portion 410 in the reduced image 400. A profile 402 represents a change in the luminance value of the same pixel row as the pixel row 411 in a reduced smoothed image obtained by smoothing the reduced image 400. It can be seen that in the reduced smoothed image, the minute change in the luminance value corresponding to a reflectance component due to the structure of the object in the original reduced image 400 is smoothed out, as represented by the profile 402. However, it can be seen that with the smoothing, the edge portion 410 is also blunted.

FIG. 4B illustrates an example of a profile of a luminance difference value between the corresponding pixels of the reduced image and the reduced smoothed image, i.e., a reflectance component of the object. In FIG. 4B, the horizontal axis indicates position, and the vertical axis indicates luminance difference value. A profile 403 represents a change in the luminance difference value of the pixel row 411. It can be seen that since the edge portion 410 is blunted in the reduced smoothed image, the absolute value of the luminance difference value at the edge portion 410 has become so great as to exceed the change in the reflectance component due to the structure of the object, as represented by the profile 403. In other words, an artifact has occurred in the edge portion 410.

FIG. 4C illustrates a histogram of the luminance difference value, which corresponds to the profile of the luminance difference value illustrated in FIG. 4B. In FIG. 4C, the horizontal axis indicates luminance difference value, and the vertical axis indicates frequency. The histogram 420 is a histogram of the luminance difference value corresponding to the profile of the luminance difference value illustrated in FIG. 4B. As described above, an artifact occurs in the edge portion 410. Since such an artifact has a relatively great absolute value of the luminance difference value, peaks occur in the vicinity of each of the lower limit and the upper limit of the histogram 420. Thus, when it is attempted to determine a correction factor based on the frequency distribution of the reflectance component of the object, the artifact influences the correction factor. As such, it is preferable that such an artifact is not included in the distribution of the reflectance component of the object which is used to calculate the correction factor.

Further, as illustrated in FIG. 4A, in the reduced smoothed image, the absolute value of the luminance difference value between neighboring pixels is relatively great for a pixel included in the edge portion, while for a pixel not included in the edge portion, the absolute value of the luminance difference value between neighboring pixels is relatively small. Thus, the edge detection unit 23 calculates an edge strength by performing edge detection filter process for each pixel of the reduced smoothed image, and detects an edge pixel based on the edge strength. For example, the edge detection unit 23 may calculate, as the edge strength, an absolute value of a value obtained by applying, as an edge detection filter, a first-order differential filter in horizontal-direction or vertical-direction (e.g., a difference between neighboring pixels or Sobel filter). Alternatively, the edge detection unit 23 may calculate a horizontal-direction edge strength and a vertical-direction edge strength by applying a first-order differential filter for both the horizontal direction and the vertical-direction and set a sum of squares thereof as the edge strength. Further alternatively, the edge detection unit 23 may calculate, as the edge strength, the absolute value of a value obtained by applying, as the edge detection filter, a second-order differential filter such as Laplacian filter.

Further, the edge detection unit 23 may apply a low-pass filter process to an image in which each pixel has an edge strength (hereinafter referred to, for convenience, as edge strength image). In this manner, the edge detection unit 23 can detect, as an edge pixel, a pixel which is determined as not being included in the edge portion by a simple edge detection processing, despite the fact that such the pixel is inherently included in the edge portion.

The edge detection unit 23 may perform, as low-pass filter process, for example, Gaussian filter process with respect to each pixel of the edge strength image.

The edge detection unit 23 compares, for each pixel of the edge strength image, the edge strength of the pixel with a predetermined threshold value (e.g., 5 to 10). Further, the edge detection unit 23 detects, as an edge pixel, a pixel whose edge strength is higher than the predetermined threshold value.

The edge detection unit 23 notifies, for each of edge pixels as detected, information representing the edge pixel, e.g., the coordinates of the edge pixel on the edge strength image to the histogram calculation unit 25.

The reduced reflectance component calculation unit 24 calculates a reflectance component of the object represented in the reduced image based on the reduced image and the reduced smoothed image. As described, the reflectance component of the object photographed in the pixel (x,y) is represented as a ratio (I(x,y)/L(x,y)) of the luminance value I(x,y) of the pixel and the illuminance of illumination light L(x,y) of the pixel (x,y). Further, the reduced smoothed image approximately represents the illuminance distribution of illumination light. Accordingly, the reduced reflectance component calculation unit 24 calculates, for each pixel of the reduced image, a logarithmic luminance difference value Log R(x,y){=Log I(x,y)−Log L(x,y)} obtained by subtracting, from a logarithmic value log I(x,y) of the luminance value I(x,y) of the pixel, a logarithmic value log L(x,y) of the luminance value L(x,y) of the corresponding pixel of the reduced smoothed image. Further, the reduced reflectance component calculation unit 24 sets the logarithmic luminance difference value Log R(x,y) of each pixel as the reflectance component of the object represented in the reduced image.

The reduced reflectance component calculation unit 24 notifies the reflectance component of the object of each pixel, i.e., the logarithmic luminance difference value Log R(x,y) to the histogram calculation unit 25.

The histogram calculation unit 25 calculates a histogram representing the frequency distribution of the reflectance component of the object by calculating the frequency for each value of the reflectance component of the object. In the present embodiment, the histogram calculation unit 25 calculates the frequency for each value of Log R(x,y) to calculate the histogram of Log R(x,y).

In the present embodiment, the histogram calculation unit 25 does not utilize the value of the reflectance component of the object for the pixel of the reduced image corresponding to the edge pixel to calculate the histogram. Thus, the histogram calculation unit 25 can suppress an artifact occurring in the edge portion from influencing the histogram. Therefore, as described in detail hereinafter, the artifact occurring in the edge portion is suppressed from influencing the calculation of the correction factor.

Figure 5:
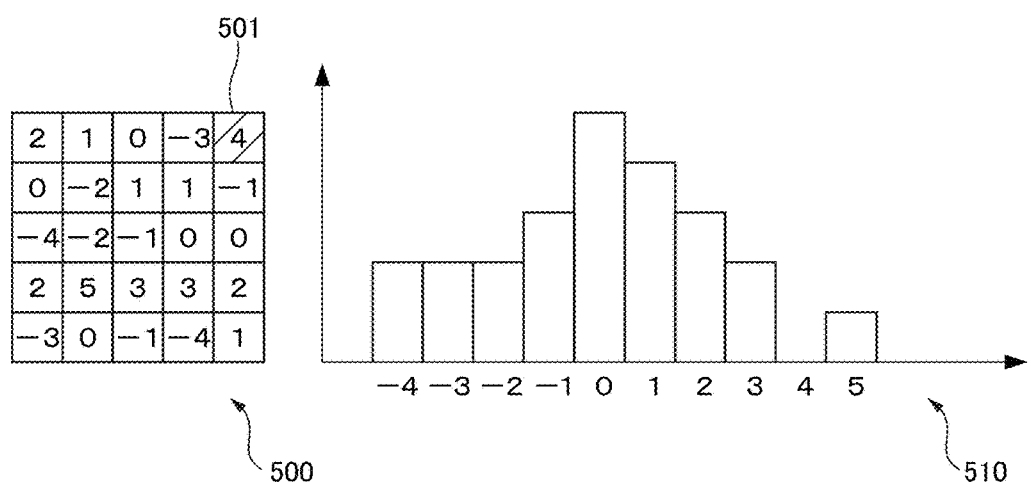
FIG. 5 illustrates an overview of histogram calculation process.

FIG. 5 illustrates an overview of histogram calculation process. The value of each pixel of an image 500 illustrated in FIG. 5 represents the value of the reflectance component of the object in the pixel. It is assumed that a pixel 501 among the pixels of the image 500 is an edge pixel. In this case, the histogram 510 is calculated excluding a value "4" for the reflectance component of the object in the pixel 501. In the histogram 510, the frequency of the value "4" is "0" since there is no other pixel in which the value of the reflectance component of the object is "4".

The histogram calculation unit 25 passes the calculated histogram to the correction factor calculation unit 26.

Based on the distribution of reflectance component of the object in each pixel other than the reflectance component of the object in the edge pixel, the correction factor calculation unit 26 calculates a correction factor which has a value corresponding to the value of the reflectance component and is used for correction of the luminance value. Therefore, in the present embodiment, the correction factor calculation unit 26 calculates a correction factor based on the histogram of the reflectance component of the object excluding the reflectance component of the object in the edge pixel.

Figure 6A:
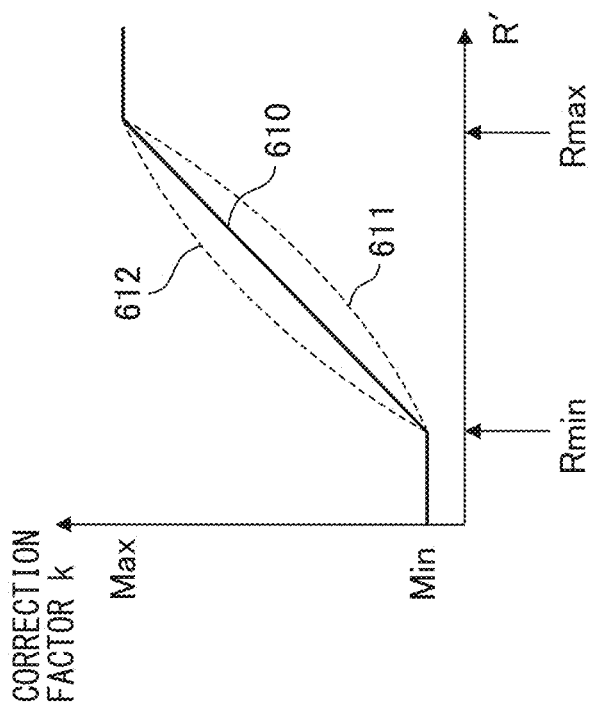
FIG. 6A is a view explaining an overview of correction factor calculation process.
Figure 6B:
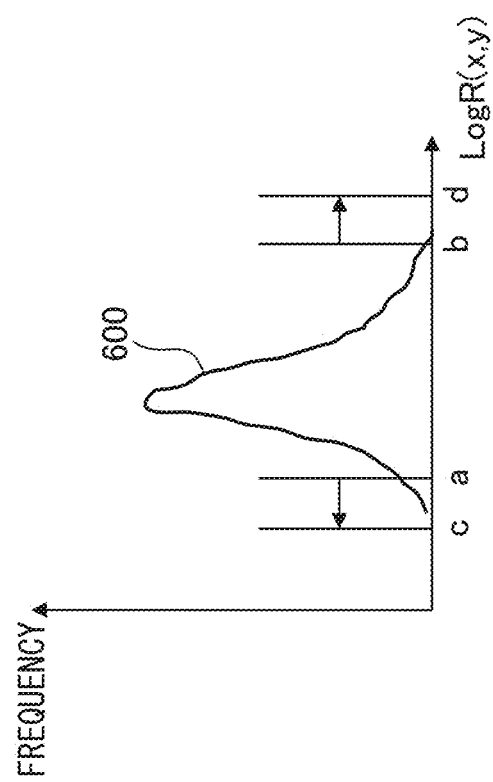
FIG. 6B is a view explaining an overview of correction factor calculation process.

FIGS. 6A and 6B are views explaining an overview of correction factor calculation process. In FIG. 6A, the horizontal axis indicates the value Log R(x,y) for the reflectance component of the object, and the vertical axis indicates the frequency. Histogram 600 is a histogram calculated by the histogram calculation unit 25.

The correction factor calculation unit 26 calculates reference value 'a' for which a cumulative frequency is a first predetermined value in order from a minimum value of the reflectance component of the object in the histogram 600. Likewise, the correction factor calculation unit 26 calculates reference value 'b' for which a cumulative frequency is a second predetermined value in order from a maximum value of the reflectance component of the object in the histogram 600. The first predetermined value and the second predetermined value may be set to, for example, values corresponding to 0.1% to 1% of the overall frequency of the histogram 600. The first predetermined value and the second predetermined value may be equal to or different from each other.

The correction factor calculation unit 26 expands the range [a, b] to a range [c, d] such that the reference value 'a' is preset value 'c' and the reference value 'b' is preset value 'd'. In other words, the correction factor calculation unit 26 converts the value Log R(x,y) for the reflectance component of the object to value R' in accordance with the following equation:

$$R' = \frac{d-c}{b-a} \times (\text{Log} R(x, y) - a) + c \quad (1)$$

FIG. 6B is a graph illustrating a relationship between the converted value R' for the reflectance component of the object and the correction factor 'k'. In FIG. 6B, the horizontal axis indicates the converted value R' for the reflectance component of the object, and the vertical axis indicates the correction factor 'k'. A graph 610 represents the relationship between the converted value R' for the reflectance component of the object and the correction factor 'k'. In this example, when the converted value R' for the reflectance component of the object is included between a lower limit value Rmin and an upper limit value Rmax, as the converted value R' increases, the correction factor 'k' increases linearly and monotonically. Meanwhile, when the converted value R' for the reflectance component of the object is smaller than or equal to the lower limit value Rmin or greater than or equal to the upper limit value Rmax, the correction factor 'k' remains constant. The lower limit value Rmin may be the same as or different from the value 'c'. The upper limit value Rmax may be the same as or different from the value 'd'. Further, the relationship between the converted value R' for the reflectance component of the object and the correction factor 'k' is not limited to that illustrated in FIG. 6B but may, for example, be represented by a downwardly convex non-linear monotonically increasing function such as graph 611. Alternatively, the relationship between the converted value R' for the reflectance component of the object and the correction factor k may be represented by an upwardly convex non-linear monotonically increasing function such as graph 612. Further alternatively, the relationship between the converted value R' for the reflectance component of the object and the correction factor k may be represented by an S-curve-shaped monotonically increasing function.

The correction factor calculation unit 26 calculates, for each value Log R(x,y) for the reflectance component of the object, the corresponding correction factor k(Log R(x,y)) by making reference to the above-described conversion equation and the relationship between the converted value R' for the reflectance component of the object and the correction factor k such as represented by the graph 610 or the like. Further, the correction factor calculation unit 26 outputs the correction factor k(Log R(x,y)) for each value of the reflectance component of the object to the correction unit 28.

The enlarging unit 27 generates an enlarged smoothed image by enlarging the reduced smoothed image such that the enlarged smoothed image has the same number of pixels as the luminance image.

In the present embodiment, the enlarging unit 27 specifies, for each pixel of the reduced smoothed image, the corresponding pixel in the original luminance image. For example, it is assumed that the reduced smoothed image is reduced to 1/m (wherein m is an integer greater than or equal to 2) with respect to the original luminance image for each of the vertical direction and the horizontal direction. In this case, the enlarging unit 27, for example, associates a pixel at the coordinates (xs,ys) in the reduced smoothed image with a pixel at the coordinates (xs*m+offsetx,ys*m+offsety) in the original luminance image. In this regard, offsetx and offsety are offset values in the horizontal direction and the vertical direction, respectively, and are set to, for example, 0 or m/2. Further, the enlarging unit 27 sequentially sets each pixel of the original luminance image as an interest pixel and specifies pixels of the reduced smoothed image at four points surrounding the interest pixel.

Figure 7:
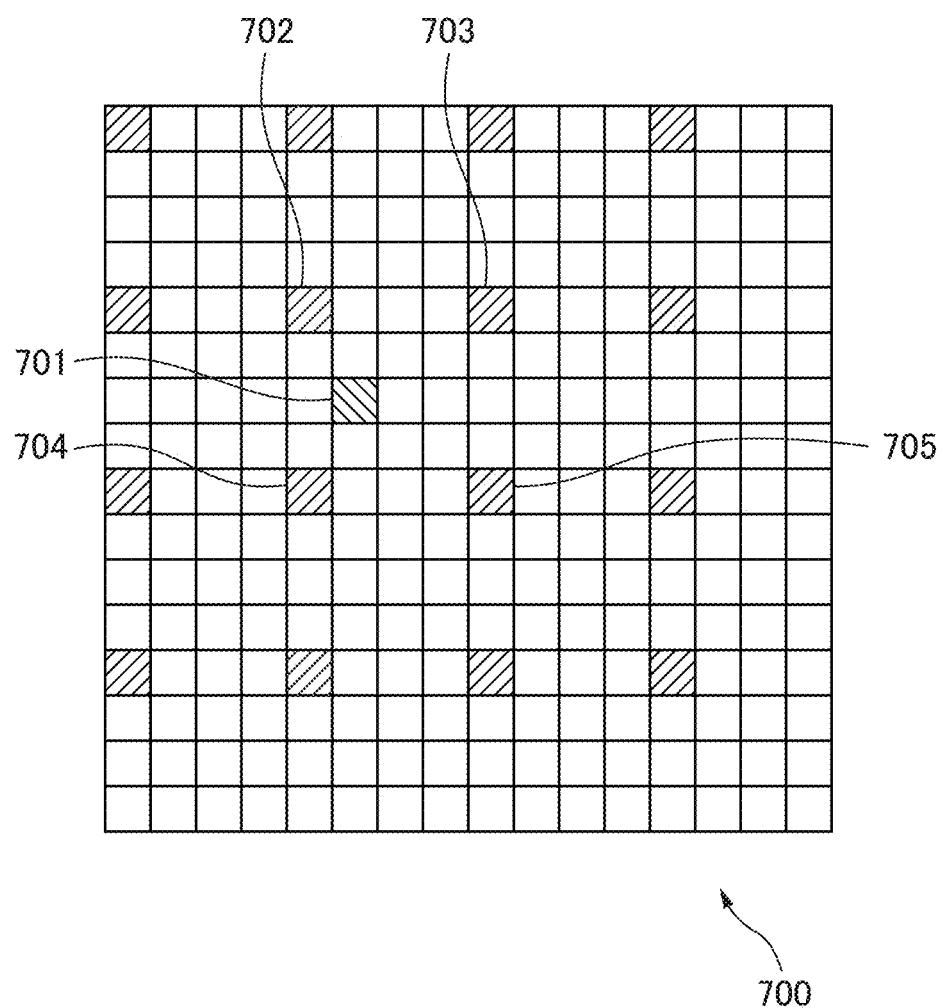
FIG. 7 illustrates an example of a positional relationship between an interest pixel of a luminance image and pixels of the reduced smoothed image which are used for enlarging and smoothing the interest pixel.

FIG. 7 illustrates an example of the positional relationship between the interest pixel of the luminance image and the pixels of the reduced smoothed image which are used for enlarging and smoothing the interest pixel. In this example, it is assumed that the reduction ratio of the reduced smoothed image is ¼.

The number of pixels in the reduced smoothed image is smaller than the number of pixels in the luminance image. Thus, each pixel of the reduced smoothed image is discretely associated with the luminance image 700, and in this example, is represented by hatching. Pixels 702 to 705 of the reduced smoothed image, which are nearest to the interest pixel 701, are used as the pixels at the four points surrounding the interest pixel for each of the top, bottom, left, and right directions of the interest pixel 701.

The enlarging unit 27 calculates, for each pixel of the luminance image, the luminance value of a corresponding pixel in the enlarged smoothed image by performing bilinear interpolation based on the luminance value of the pixel of the reduced smoothed image for each of the surrounding four points. Alternatively, the enlarging unit 27 may calculate, for each pixel of the luminance image, the luminance value of the corresponding pixel of the enlarged smoothed image by other interpolation method, e.g., nearest-neighbor interpolation or bicubic interpolation.

The enlarging unit 27 outputs the enlarged smoothed image to the correction unit 28.

The correction unit 28 generates a luminance-corrected image based on the luminance image and the enlarged smoothed image. Since the enlarged smoothed image is considered to approximately represents the illuminance distribution of illumination light, in the present embodiment, the correction unit 28 calculates the luminance value R'(x,y) of each pixel of the luminance-corrected image in accordance with the following equation based on the Retinex theory:

$$R'(x,y)=k(\text{Log } R(x,y))\times \text{Log } R(x,y)$$

$$\text{Log } R(x,y)=\text{Log } I(x,y)-\text{Log } L(x,y) \qquad (2)$$

wherein I(x,y) represents the luminance value of the pixel (x,y) of the luminance image, and L(x,y) represents the luminance value of the pixel (x,y) of the enlarged smoothed image. k(Log R(x,y)) is the correction factor calculated by the correction factor calculation unit 26.

The correction unit 28 may calculate the luminance value of each pixel of the luminance-corrected image by combining the luminance value R'(x,y) calculated by the equation (2) and the original luminance value I(x,y) with a predetermined blend ratio.

Further, the correction unit 28 calculates the luminance correction factor γ for each pixel of the luminance-corrected image.

The correction unit 28 outputs the obtained luminance-corrected image to the inverse color conversion unit 14, and outputs the luminance correction factor γ for each pixel to the chroma correction unit 13.

Figure 8:
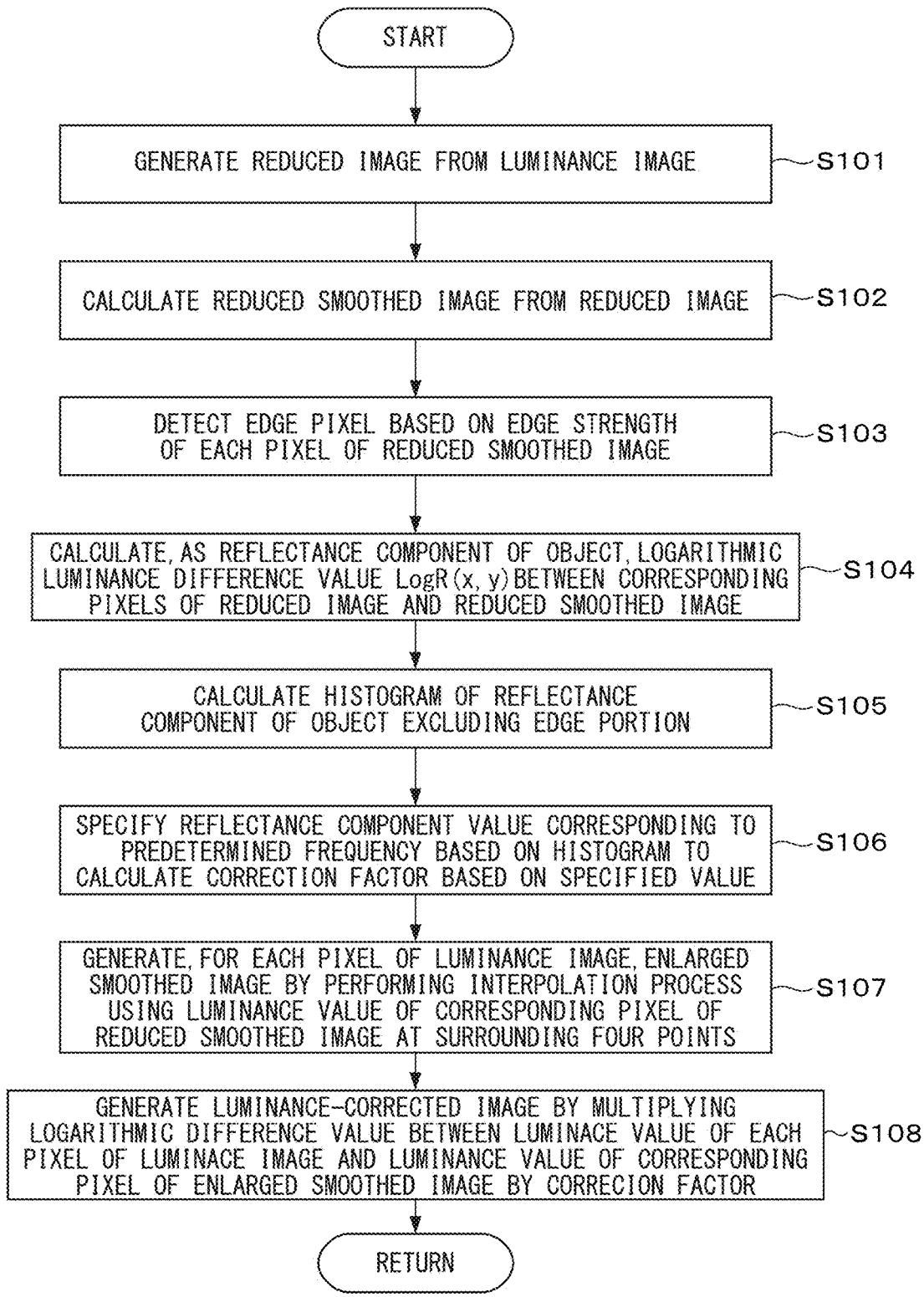
FIG. 8 is an operation flowchart of luminance correction process.

FIG. 8 is an operation flowchart of luminance correction process performed by the luminance correction unit 12.

The reduced image generation unit 21 generates a reduced image from a luminance image (step S101). Further, the reducing/smoothing unit 22 generates a reduced smoothed image by performing smoothing filter process for each pixel of the reduced image (step S102).

The edge detection unit 23 calculates an edge strength of each pixel of the reduced smoothed image, and detects, as an edge pixel included in an edge portion, a pixel in which the edge strength is greater than a predetermined threshold value (step S103).

Further, the reduced reflectance component calculation unit 24 calculates, for each pixel of the reduced image, a logarithmic luminance difference value Log R(x,y) between the pixel and the corresponding pixel of the reduced smoothed image as a reflectance component of an object (step S104).

The histogram calculation unit 25 calculates a histogram of the reflectance component of the object excluding the edge portion by calculating a frequency for each value of the reflectance component Log R(x,y) based on the reflectance component Log R(x,y) of the object in each pixel other than the edge pixel of the reduced image (step S105). Then the correction factor calculation unit 26 calculates, based on the histogram, a correction factor k(Log R(x,y)) having a value corresponding to the value of the reflectance component Log R(x,y) (step S106).

The enlarging unit 27 specifies, for each pixel of the original luminance image, pixels of the reduced smoothed image at surrounding four points. Further, the enlarging unit 27 generates an enlarged smoothed image by setting a value obtained by performing interpolation process using the luminance value of the reduced smoothed image for each of the surrounding four points as the luminance value of the corresponding pixel of the enlarged smoothed image (step S107).

The correction unit 28 calculates, for each pixel of the original luminance image, the reflectance component Log R(x,y) of the object based on the luminance value I(x,y) of the pixel and the luminance value L(x,y) of the corresponding pixel of the enlarged smoothed image. Then the correction unit 28 generates a luminance-corrected image by emphasizing the reflectance component Log R(x,y) with a correction factor k(Log R(x,y)) corresponding to the value of Log R(x,y) (step S108). Thereupon the luminance correction unit 12 completes the luminance correction process.

Figure 9:
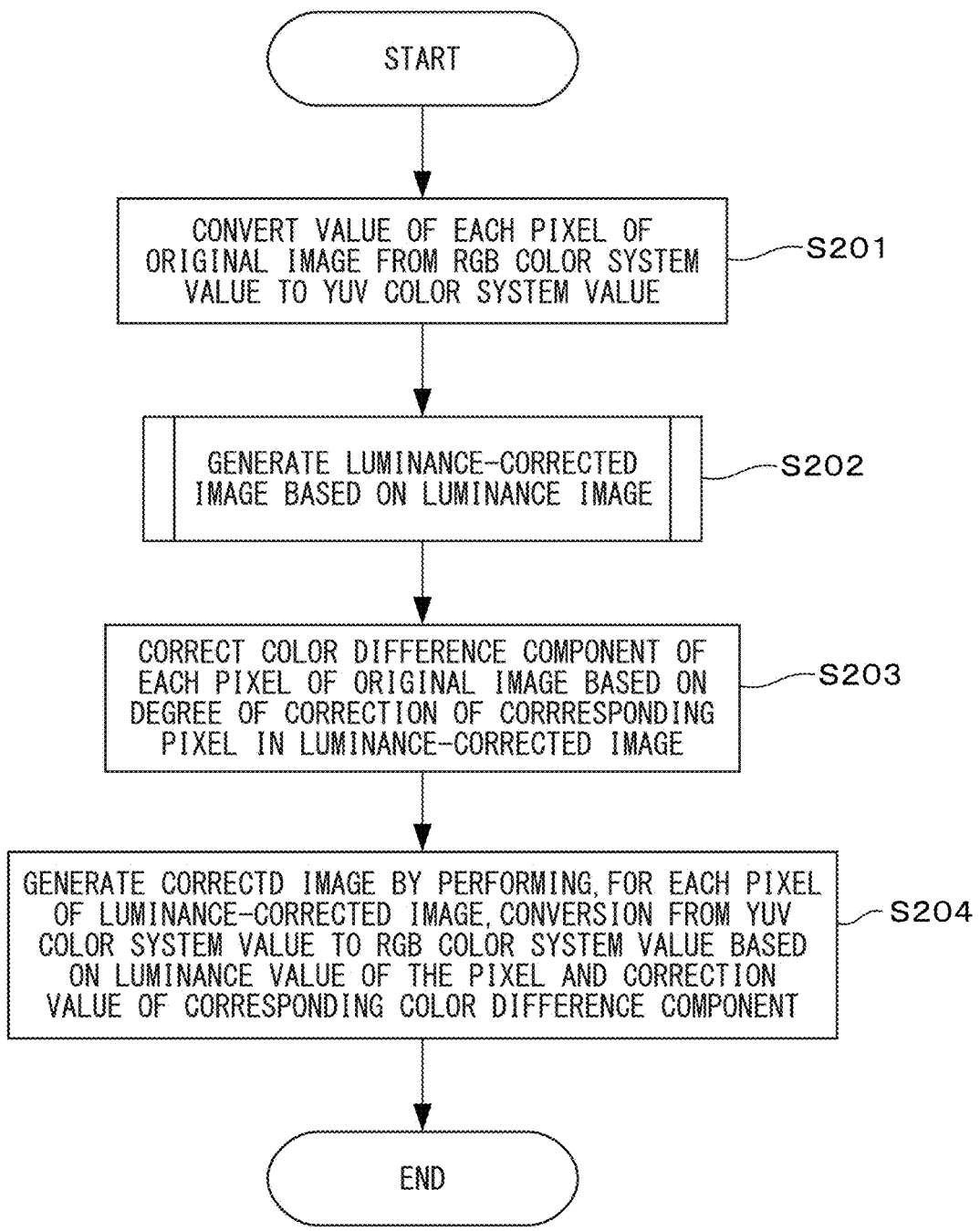
FIG. 9 is an operation flowchart of image correction process.

FIG. 9 is an operation flowchart of the image correction process performed by the control unit 6.

The color conversion unit 11 performs, for each pixel of the original image, conversion from an RGB color system value to a YUV color system value (step S201). Further, the color conversion unit 11 outputs a luminance image representing the luminance component of each pixel of the original image to the luminance correction unit 12, and outputs a color difference image representing the color difference component of each pixel of the original image to the chroma correction unit 13.

The luminance correction unit 12 generates, based on the luminance image, a luminance-corrected image in which the contrast of the object is enhanced (step S202). Further, the chroma correction unit 13 corrects the color difference component of each pixel of the color difference image based on the degree of luminance correction in the luminance-corrected image (step S203).

The inverse color conversion unit 14 performs, for each pixel of the luminance-corrected image, conversion from a YUV color system value represented by the luminance value of the pixel and the color difference component of the corresponding pixel of the corrected color difference image to an RGB color system value to generate a corrected image (step S204). Thereupon, the control unit 6 completes the image correction process.

As has been described above, the image correction apparatus calculates a correction factor which has a value corresponding to the value of a reflectance component of an object based on a reduced image and a reduced smoothed image which are used to generate an enlarged smoothed image representing a distribution of illumination light. Thus, as compared with a case in which the correction factor is calculated based on an original luminance image per se, the number of pixels to which reference is made when calculating the corrector factor is decreased. Accordingly, the image correction apparatus is capable of reducing not only the amount of calculation required to calculate the distribution of illumination light but also the amount of calculation required to calculate the correction factor. Further, when calculating a histogram of the reflectance component of the object which is used to calculate the correction factor, the image correction apparatus generates the histogram, excluding the edge pixel included in the edge portion. In this manner, the image correction apparatus suppresses an artifact occurring in the edge portion from influencing the correction factor and thus can calculate the correction factor that can appropriately emphasize the reflectance component of the object.

According to a modified example, the histogram calculation unit 25 may calculate a histogram after substituting zero (0) for the value of the reflectance component of the object for the edge pixel. In this case, the number of edge pixels is recorded as a frequency of value "zero (0)". Thus, in this modified example as well, the reflectance component of the object in the edge pixel is not reflected in the histogram, so that the artifact occurring in the edge portion is suppressed from influencing calculation of the correction factor.

Further, according to another modified example, the edge pixel may be used in the calculation of the reflectance component of the object on the reduced image by the reduced reflectance component calculation unit 24 instead of being used in the creation of the histogram by the histogram calculation unit 25. For example, the reduced reflectance component calculation unit 24 generates a corrected reduced smoothed image by substituting the luminance value of the edge pixel in the reduced smoothed image with the luminance value of the corresponding pixel in the reduced image. The reduced reflectance component calculation unit 24 may calculate the logarithmic luminance difference value Log R(x,y) between the corresponding pixels of the reduced image and the corrected reduced smoothed image. In this case, for the edge pixel, the logarithmic luminance difference value Log R(x,y) is "zero (0)" since the luminance values of the reduced image and the corrected reduced smoothed image become the same. Therefore, as in the foregoing modified example, the number of edge pixels is recorded as a frequency of value "0" in the histogram of the reflectance component of the object. Thus, in this modified example, an artifact occurring in the edge portion is suppressed from influencing the calculation of the correction factor since the reflectance component of the object in the edge pixel is not reflected in the histogram.

Further, the reduced reflectance component calculation unit 24 may generate a corrected reduced smoothed image by substituting the luminance value of each pixel of the reduced smoothed image with a value obtained by blending the luminance value of the pixel and the luminance value of the corresponding pixel of the reduced image in accordance with the edge strength of the corresponding pixel of an edge strength image. In this case, the reduced reflectance component calculation unit 24 increases the blend ratio of the luminance value of the corresponding pixel of the reduced image while decreases the blend ratio of the luminance value of the corresponding pixel of the reduced smoothed image as the edge strength of the corresponding pixel of the edge strength image increases. When the edge strength is greater than or equal to a predetermined upper limit value, the reduced reflectance component calculation unit 24 sets the blend ratio of the luminance value of the corresponding pixel of the reduced image to 100%.

In this case, since the absolute value of the logarithmic luminance difference value Log R(x,y) is smaller for a pixel having a higher edge strength, it is suppressed that an artifact which occurs in the edge portion influences the calculation of the correction factor.

Further, in order to more accurately detect the edge portion due to the luminance distribution of illumination light, in the reduced smoothed image, it is preferable that a luminance value change in the edge portion is preserved as possible, while smoothing the luminance value change caused by the structure of the object.

Figure 10:
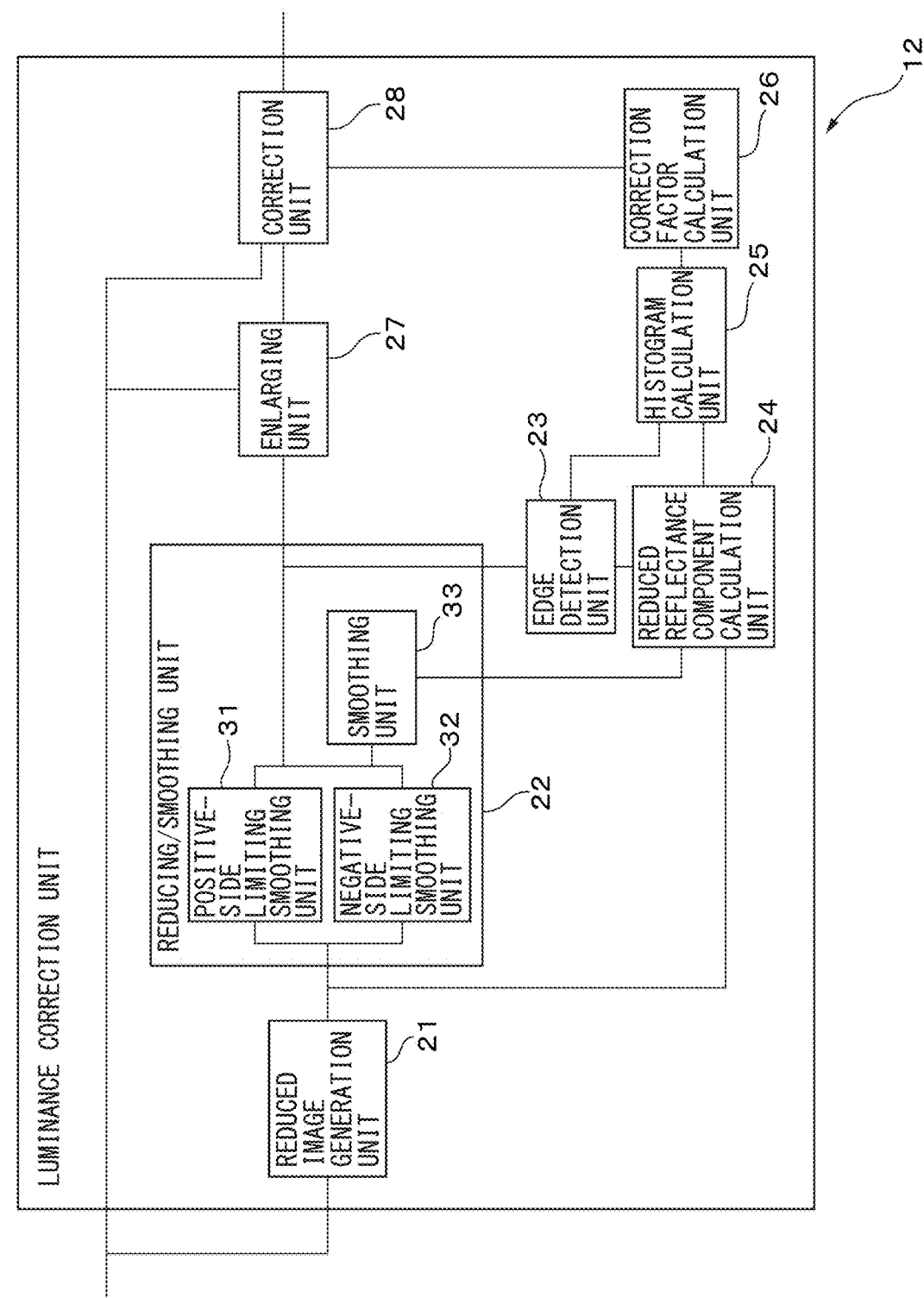
FIG. 10 is a functional block diagram of a luminance correction unit according to a modified example.

FIG. 10 is a functional block diagram of the luminance correction unit 12 according to a modified example which can preserve a luminance value change in the edge portion while smoothing the luminance value change caused by the structure of the object in the reduced smoothed image. The luminance correction unit 12 includes the reduced image generation unit 21, the reducing/smoothing unit 22, the edge detection unit 23, the reduced reflectance component calculation unit 24, the histogram calculation unit 25, the correction factor calculation unit 26, the enlarging unit 27, and the correction unit 28. The reducing/smoothing unit 22 includes a positive-side limiting smoothing unit 31, a negative-side limiting smoothing unit 32, and a smoothing unit 33. The luminance correction unit 12 according to this modified example is different from the luminance correction unit 12 according to the above-described embodiment in respect of processes of the reducing/smoothing unit 22, the edge detection unit 23, the reduced reflectance component calculation unit 24, and the enlarging unit 27. Hereinafter, the reducing/smoothing unit 22, the edge detection unit 23, the reduced reflectance component calculation unit 24, and the enlarging unit 27 will be described. With regard to the other components of the luminance correction unit 12, refer to the description of the corresponding components in the above-described embodiment.

The positive-side limiting smoothing unit 31 of the reducing/smoothing unit 22 performs a smoothing process, for each pixel of the reduced image, through a weighted addition of differences between the luminance value of the pixel and the luminance values of the reference pixels in the filter area including the pixel with weights corresponding to the differences. However, when the difference obtained by subtracting the luminance value of the interest pixel from the luminance value of the reference pixel is greater than or equal to a predetermined value, the positive-side limiting smoothing unit 31 decreases the weighting factor for the reference pixel. In other words, a limitation is imposed on reference to the reference pixel in which the difference obtained by subtracting the luminance value of the interest pixel from the luminance value of the reference pixel is greater than or equal to the predetermined value. The positive-side limiting smoothing unit 31 performs a positive-side limiting smoothing process, for example, in accordance with the following equation:

$$p'_{x,y} = p_{x,y} + \sum_{i,j \in [-K,K]} \frac{w(p_{x+i,y+j} - p_{x,y})}{N} \quad (3)$$

wherein $p_{x,y}$ is the luminance value of the pixel (x,y) before correction, and $p'_{x,y}$ is the luminance value of the pixel (x,y) after correction. Further, $p_{x+i,y+j}$ is the luminance value of the reference pixel (x+i,y+j) in the filter area [−K, K]; $w(p_{x+i,y+j}-p_{x,y})$ is the weighting factor set based on $(p_{x+i,y+j}-p_{x,y})$; and N is the number of pixels included in the filter area.

Likewise, the negative-side limiting smoothing unit 32 performs a smoothing process, for each pixel of the reduced image, through a weighted addition of differences between the luminance value of the pixel and the luminance values of the reference pixels in the filter area including the pixel with weights corresponding to the differences. However, when the difference obtained by subtracting the luminance value of the reference pixel from the luminance value of the interest pixel is greater than or equal to a predetermined value, the negative-side limiting smoothing unit 32 decreases the weighting factor for the reference pixel. In other words, a limitation is imposed on reference to the reference pixel in which the difference obtained by subtracting the luminance value of the reference pixel from the luminance value of the interest pixel is greater than or equal to the predetermined value. The negative-side limiting smoothing unit 32 performs a negative-side limiting smoothing process, for example, in accordance with equation (3) as with the positive-side limiting smoothing process. The filter area set for the negative-side limiting smoothing process is similar to the filter area set for the positive-side limiting smoothing process.

Figure 11:
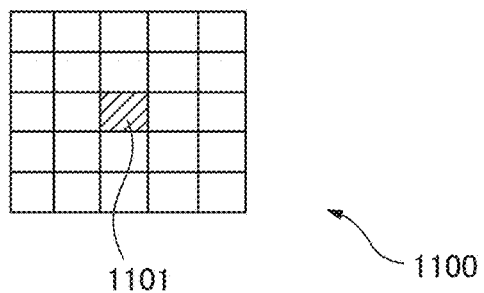
FIG. 11 illustrates an example of a filter area in which a positive-side limiting smoothing process and a negative-side limiting smoothing process are performed.

FIG. 11 illustrates an example of a filter area in which the positive-side limiting smoothing process and the negative-side limiting smoothing process are performed. In this example, when an interest pixel 1101 of a reduced image is positive-side limiting smoothed or negative-side limiting smoothed, a filter area 1100 with vertical five pixels× horizontal five pixels centered at the interest pixel 1101 is set. The luminance values of the twenty-five reference pixels (including the interest pixel 1101 per se) in the filter area 1100 are referenced.

Figure 12A:
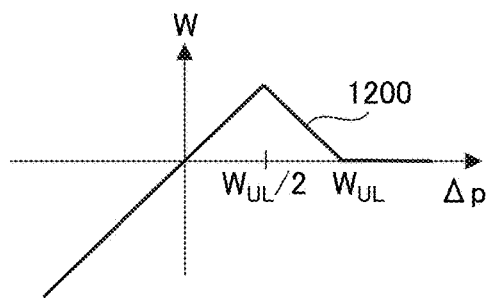
FIG. 12A illustrates an example of a relationship between a difference between a luminance value of a reference pixel and a luminance value of an interest pixel and a weighting factor in the positive-side limiting smoothing process.

FIG. 12A illustrates an example of the relationship between a difference between a luminance value of a reference pixel and a luminance value of an interest pixel and a weighting factor in the positive-side limiting smoothing process. In FIG. 12A, the horizontal axis indicates the difference between the luminance value of the reference pixel and the luminance value of the interest pixel, and the vertical axis indicates the weighting factor. A graph 1200 represents the relationship between the difference between the luminance value of the reference pixel and the luminance value of the interest pixel, $\Delta p$ ($=p_{x+i,y+j}-p_{x,y}$), and the weighting factor w. As represented by the graph 1200, when the difference $\Delta p$ is smaller than or equal to ½ of a weight upper limit $W_{UL}$ (wherein $W_{UL}>0$), the weighting factor w linearly and monotonically increases at a gradient of 1 as the difference $\Delta p$ increases. Thus, it follows that $w=\Delta p$. On the other hand, when the difference $\Delta p$ is greater than ½ of the weight upper limit $W_{UL}$ and smaller than or equal to the weight upper limit $W_{UL}$, the weighting factor w linearly and monotonically decreases at a gradient of −1 as the difference $\Delta p$ increases. Accordingly, it follows that $w=(W_{UL}-\Delta p)$. Further, when the difference $\Delta p$ is greater than the weight upper limit $W_{UL}$, it follows that the weighting factor $w=0$. When the luminance value is represented by 0 to 255, the weight upper limit $W_{UL}$ is set, for example, to 10 to 20.

Figure 12B:
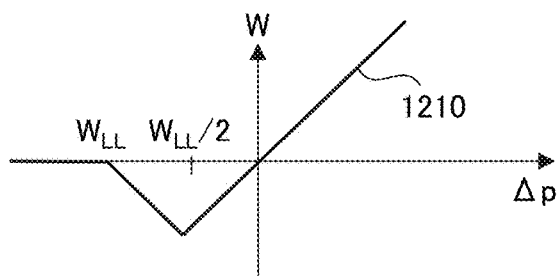
FIG. 12B illustrates an example of a relationship between a difference between a luminance value of a reference pixel and a luminance value of an interest pixel and a weighting factor in the negative-side limiting smoothing process.

FIG. 12B illustrates an example of the relationship between a difference between a luminance value of a reference pixel and a luminance value of an interest pixel and a weighting factor in the negative-side limiting smoothing process. In FIG. 12B, the horizontal axis indicates the difference between the luminance value of the reference pixel and the luminance value of the interest pixel, and the vertical axis indicates the weighting factor. A graph 1210 represents the relationship between the difference between the luminance value of the reference pixel and the luminance value of the interest pixel, $\Delta p$ ($=p_{x+i,y+j}-p_{x,y}$), and the weighting factor w. As represented by the graph 1210, when the difference $\Delta p$ is greater than or equal to ½ of a weight lower limit $W_{LL}$ (wherein $W_{LL}<0$), the weighting factor w linearly and monotonically increases at a gradient of 1 as the difference $\Delta p$ increases. Thus, it follows that $w=\Delta p$. On the other hand, when the difference $\Delta p$ is smaller than ½ of the weight lower limit $W_{LL}$ and greater than or equal to the weight lower limit $W_{LL}$, the weighting factor w linearly and monotonically decreases at a gradient of −1 as the difference $\Delta p$ increases. Accordingly, it follows that $w=(W_{LL}-\Delta p)$. Further, when the difference $\Delta p$ is smaller than the weight lower limit $W_{LL}$, it follows that the weighting factor $w=0$. When the luminance value is represented by 0 to 255, the weight upper limit $W_{LL}$ is set, for example, to −10 to −20.

Figure 13A:
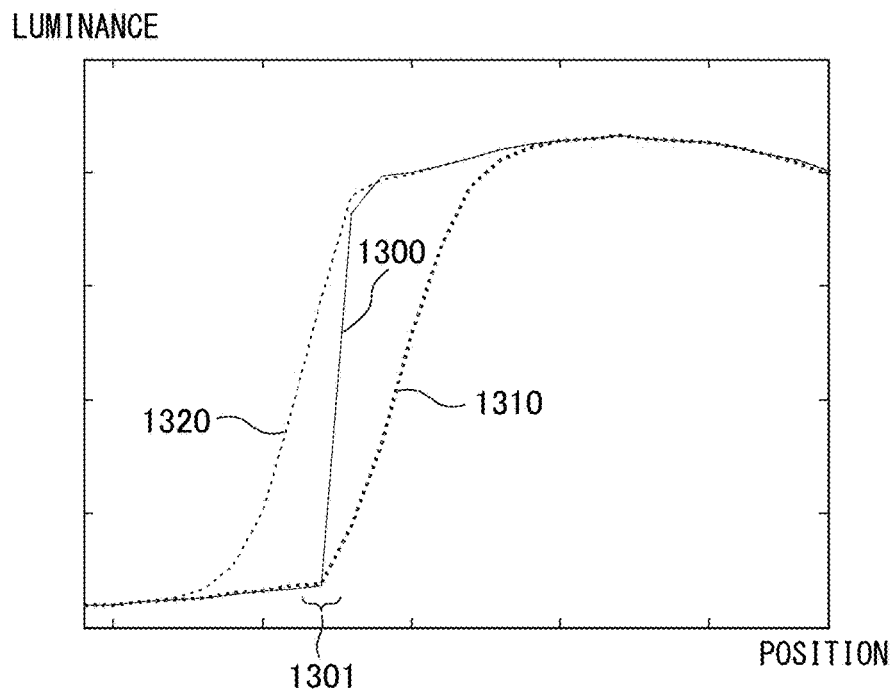
FIG. 13A illustrates an example of a relationship between an original reduced image and a reduced image obtained by applying the positive-side limiting smoothing process and a reduced image obtained by applying the negative-side limiting smoothing process.
Figure 13B:
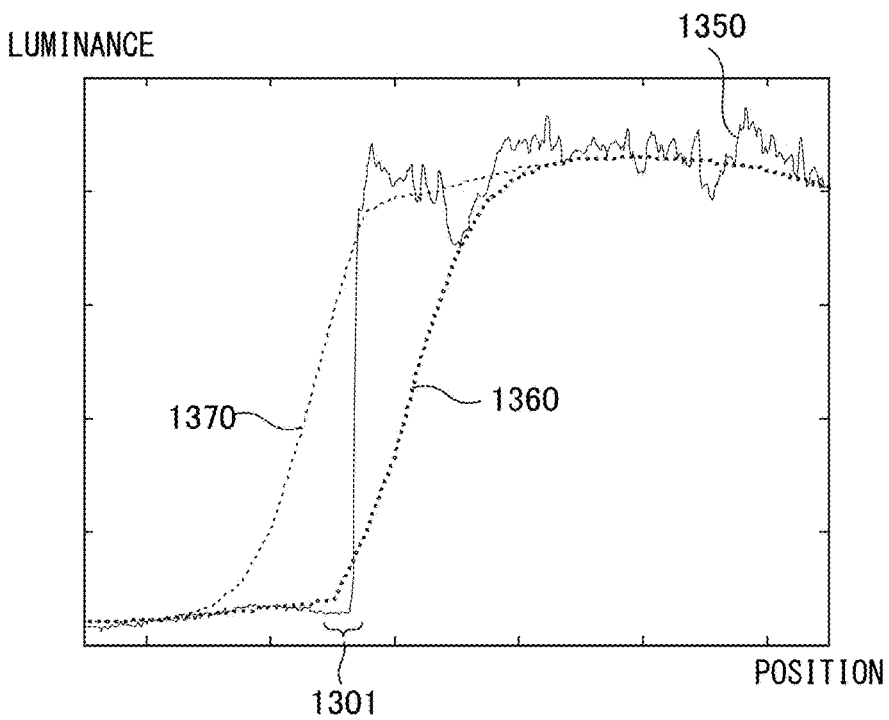
FIG. 13B illustrates an example of a relationship between a luminance image corresponding to the reduced image illustrated in FIG. 13A and interpolated images obtained by bilinear interpolation of the reduced image to which the positive-side limiting smoothing process has been applied and the reduced image to which the negative-side limiting smoothing process is applied illustrated in FIG. 13A.

FIG. 13A illustrates an example of the relationship between the original reduced image and a reduced image obtained by applying the positive-side limiting smoothing process (hereinafter, referred to for convenience as a positive-side limiting smoothed image) and a reduced image obtained by applying the negative-side limiting smoothing process (hereinafter, referred to for convenience as a negative-side limiting smoothed image). FIG. 13B illustrates an example of the relationship between a luminance image corresponding to the reduced image illustrated in FIG. 13A and interpolated images obtained by bilinear interpolation of the positive-side limiting smoothed image and the negative-side limiting smoothed image illustrated in FIG. 13A. In FIGS. 13A and 13B, the horizontal axis indicates a horizontal position in the reduced image or the luminance image, and the vertical axis indicates a luminance value. A profile 1300 in FIG. 13A represents a profile of luminance values of a horizontal pixel row in the original reduced image. Further, a profile 1310 represents a profile of luminance values of the same pixel row as the pixel row represented by the profile 1300 in the positive-side limiting smoothed image. A profile 1320 represents a profile of luminance values of the same pixel row as the pixel row represented by the profile 1300 in the negative-side limiting smoothed image. Further, a profile 1350 in FIG. 13B represents a profile of luminance values of a horizontal pixel row corresponding to the pixel row in the reduced image represented by the profile 1300 in the luminance image. Likewise, a profile 1360 represents a profile of luminance values of a horizontal pixel row in an interpolated image of the positive-side limiting smoothed image corresponding to the horizontal pixel row in the positive-side limiting smoothed image represented by the profile 1310. Further, a profile 1370 represents a profile of luminance values of a horizontal pixel row in an interpolated image of the negative-side limiting smoothed image corresponding to the pixel row in the negative-side limiting smoothed image represented by the profile 1320.

As described above, in the positive-side limiting smoothing process, a limitation is imposed on reference to the reference pixel in which the difference obtained by subtracting the luminance value of the interest pixel from the luminance value of the reference pixel is greater than or equal to the predetermined value. Therefore, in positive-side limiting smoothing, the reference pixel having a luminance value lower than the luminance value of the interest pixel is to be referred to rather than the reference pixel having a higher luminance value than the luminance value of the interest pixel. Thus, when an edge portion of the illuminance distribution of illumination light is included in the filter area and the interest pixel is located at a higher luminance side than the edge portion, there is a tendency that the luminance value of the interest pixel smoothed by the positive-side limiting smoothing process is lower than the original luminance value. Thus, as represented by the profile 1310 and the profile 1360, the luminance values of the pixels in the positive-side limiting smoothed image is lower than the luminance values of the pixels at the same positions in the original reduced image in the vicinity of an edge portion 1301 of the profile 1300 and on the higher luminance side than the edge portion 1301. Meanwhile, at other positions, the luminance values of the pixels in the positive-side limiting smoothed image and the luminance values of the pixels at the same positions in the original reduced image are substantially equal to each other. This is because the number of the pixels which are not referenced in the positive-side limiting smoothing process due to the difference Δp being greater than or equal to the weight upper limit decreases.

Meanwhile, in the negative-side limiting smoothing process, a limitation is imposed on reference to the reference pixel in which the difference obtained by subtracting the luminance value of the reference pixel from the luminance value of the interest pixel is greater than or equal to the predetermined value. Therefore, the reference pixel having a higher luminance value than the luminance value of the interest pixel is to be referred to rather than the reference pixel having a lower luminance value than the luminance value of the interest pixel in the negative-side limiting smoothing. Thus, when an edge portion of the illuminance distribution of illumination light is included in the filter area and the interest pixel is located at a lower luminance side than the edge portion, there is a tendency that the luminance value of the interest pixel smoothed by the negative-side limiting smoothing process is higher than the original luminance value. Thus, as represented by the profile 1320 and the profile 1370, the luminance values of the pixels in the negative-side limiting smoothed image is higher than the luminance values of the pixels at the same positions in the original reduced image in the vicinity of the edge portion 1301 and on the lower luminance side than the edge portion 1301. Meanwhile, at other positions, the luminance values of the pixels in the negative-side limiting smoothed image and the luminance values of the pixels at the same positions in the original reduced image are substantially equal to each other. This is because the number of the pixels which are not referenced in the negative-side limiting smoothing process due to the difference Δp being smaller than or equal to the weight lower limit decreases.

Therefore, the higher luminance side than the edge portion of the illuminance distribution of illumination light in the original reduced image is relatively accurately represented in the negative-side limiting smoothed image rather than in the positive-side limiting smoothed image. Meanwhile, the lower luminance side than the edge portion in the original reduced image is relatively accurately represented in the positive-side limiting smoothed image rather than in the negative-side limiting smoothed image. In other words, the edge portion is included in a range in which the luminance value of the negative-side limiting smoothed image is higher than that of the positive-side limiting smoothed image.

The positive-side limiting smoothing unit 31 outputs the positive-side limiting smoothed image to the edge detection unit 23 and the enlarging unit 27. Further, the negative-side limiting smoothing unit 32 outputs the negative-side limiting smoothed image to the edge detection unit 23 and the enlarging unit 27.

The smoothing unit 33 generates a reduced smoothed image based on the positive-side limiting smoothed image and the negative-side limiting smoothed image. For example, the smoothing unit 33 generates the reduced smoothed image by calculating, for each pixel of the positive-side limiting smoothed image, an average of the luminance value of the pixel and the luminance value of the corresponding pixel of the negative-side limiting smoothed image and setting the average as the luminance value of the corresponding pixel of the reduced smoothed image. Then the smoothing unit 33 outputs the reduced smoothed image to the reduced reflectance component calculation unit 24.

The edge detection unit 23 detects the edge portion due to the illuminance distribution of illumination light on the reduced image based on the positive-side limiting smoothed image and the negative-side limiting smoothed image.

As described above, the edge portion of the illuminance distribution of illumination light is included in a range in which the luminance value of the negative-side limiting smoothed image is higher than that of the positive-side limiting smoothed image. Thus, the edge detection unit 23 can estimate the edge portion of the illuminance distribution of illumination light based on the luminance difference absolute value between the corresponding pixels of the negative-side limiting smoothed image and the positive-side limiting smoothed image.

Figure 14A:
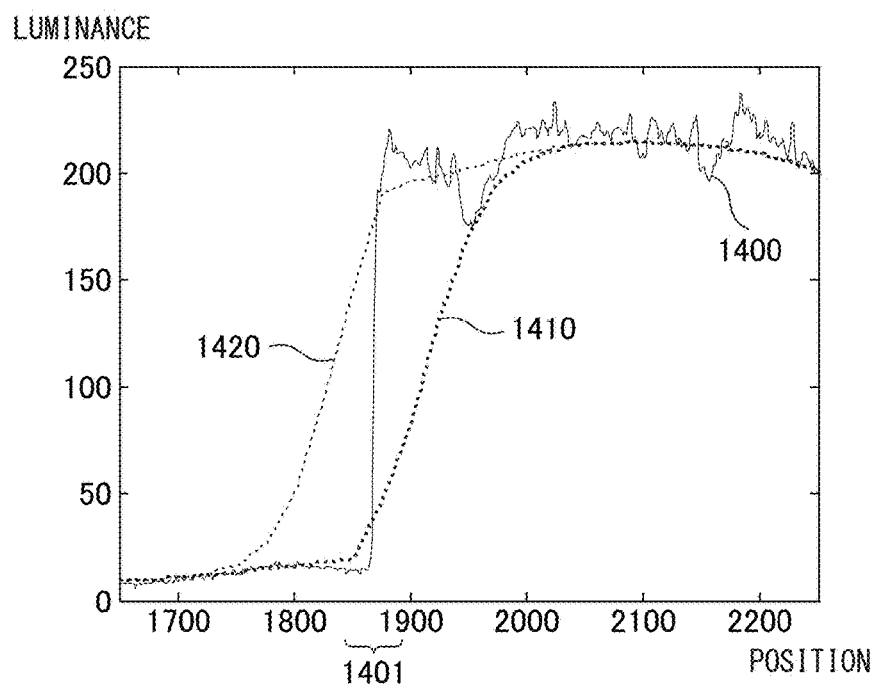
FIG. 14A illustrates an example of the relationship between the interpolated images obtained by bilinear interpolation of the positive-side limiting smoothed image and the negative-side limiting smoothed image and the luminance image.
Figure 14B:
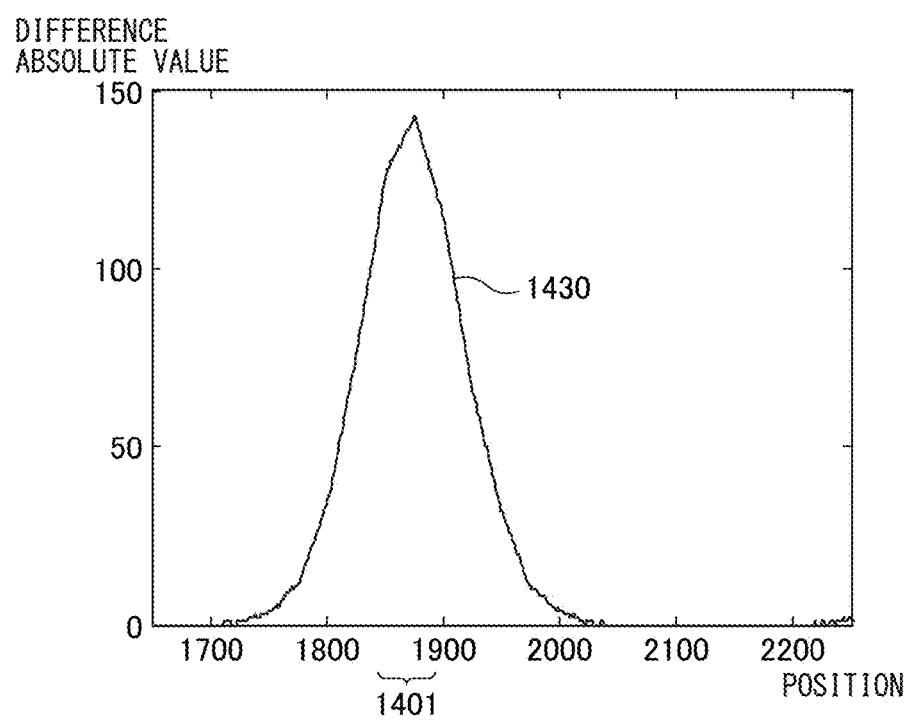
FIG. 14B illustrates an example of a luminance difference absolute value between corresponding pixels of the interpolated images obtained by bilinear interpolation of the negative-side limiting smoothed image and the positive-side limiting smoothed image.

FIG. 14A illustrates an example of the relationship between the interpolated images obtained by bilinear interpolation of the positive-side limiting smoothed image and the negative-side limiting smoothed image and the luminance image, and FIG. 14B illustrates an example of the luminance difference absolute value between the corresponding pixels of the interpolated images obtained by bilinear interpolation of the negative-side limiting smoothed image and the positive-side limiting smoothed image. In FIG. 14A, the horizontal axis indicates the horizontal position in each image, and the vertical axis indicates the luminance value. In FIG. 14B, the horizontal axis indicates the horizontal position in a difference image, and the vertical axis indicates the difference absolute value.

In FIG. 14A, profile 1400 represents a profile of luminance values of a horizontal pixel row in the luminance image. Profile 1410 represents a profile of luminance values of the same pixel row as the pixel row represented by the profile 1400 in an interpolated image obtained by bilinear interpolation of the positive-side limiting smoothed image. Profile 1420 represents a profile of luminance values of the same pixel row as the pixel row represented by the profile 1400 in an interpolated image obtained by bilinear interpolation of the negative-side limiting smoothed image. Further, in FIG. 14B, profile 1430 represents a profile of luminance difference absolute values of the same pixel row as the pixel row represented by the profile 1400 between the corresponding pixels of the interpolated images obtained by bilinear interpolation of the negative-side limiting smoothed image and the positive-side limiting smoothed image.

As illustrated in FIG. 14A, an edge portion 1401 of the illuminance distribution of illumination light is included in a range in which the luminance value of the negative-side limiting smoothed image is higher than that of the positive-side limiting smoothed image. Further, the range coincides with a range in which the difference absolute value is relatively great as illustrated in FIG. 14B.

The edge detection unit 23 calculates, for each pixel of the negative-side limiting smoothed image, the difference absolute value between the luminance value of the pixel and the luminance value of the corresponding pixel of the positive-side limiting smoothed image as the edge strength. Further, the edge detection unit 23 detects, as the edge pixel, a pixel in which the difference absolute value is greater than or equal to a predetermined difference threshold value (e.g., 5 to 10). Then the edge detection unit 23 notifies information representing the detected edge pixel to the histogram calculation unit 25 or the reduced reflectance component calculation unit 24.

The reduced reflectance component calculation unit 24 calculates the reflectance component of the object in the reduced image based on the reduced image and the reduced smoothed image, as in the above-described embodiment or modified example. Alternatively, the reduced reflectance component calculation unit 24 may generate the corrected reduced smoothed image by substituting or combining the luminance value of the edge pixel in the reduced smoothed image with the luminance value of the corresponding pixel in the reduced image. Then the reduced reflectance component calculation unit 24 may calculate the reflectance component of the object based on the reduced image and the corrected reduced smoothed image.

The histogram calculation unit 25 calculates a histogram by determining the frequency of each value of the reflectance component of the object excluding the edge pixel or with the value of the reflectance component of the object in the edge pixel set to "0", as in the above-described embodiment or modified example. Then the correction factor calculation unit 26 calculates a correction factor based on the value of the reflectance component of the object based on the histogram.

The enlarging unit 27 generates an enlarged smoothed image having the same size as the luminance image based on the positive-side limiting smoothed image, the negative-side limiting smoothed image, and the original luminance image.

The enlarging unit 27 specifies, for each pixel of the luminance image, the pixels which are nearest to the four points surrounding the pixel in the positive-side limiting smoothed image and the negative-side limiting smoothed image.

The enlarging unit 27 calculates, for each of the surrounding four points, a first reference value which is obtained by combining the luminance value of the pixel at the point in the positive-side limiting smoothed image with the luminance value of the interest pixel in the original luminance image and a second reference value which is obtained by combining the luminance value of the pixel at the point in the negative-side limiting smoothed image with the luminance value of the interest pixel in the original luminance image. Further, the enlarging unit 27 calculates, for each of the surrounding four points, the luminance value of a corresponding pixel in the enlarged smoothed image by performing bilinear interpolation based on a combined reference value obtained by averaging the first reference value and the second reference value.

As described above, the higher luminance side than the edge of the illuminance distribution of illumination light in the original reduced image is relatively accurately represented in the negative-side limiting smoothed image rather than in the positive-side limiting smoothed image. Meanwhile, the lower luminance side than the edge in the original reduced image is relatively accurately represented in the positive-side limiting smoothed image rather than in the negative-side limiting smoothed image. Accordingly, for each of the four points surrounding the interest pixel in the luminance image, the enlarging unit 27 makes the weight for the higher one of the luminance value of the pixel in the positive-side limiting smoothed image and the luminance value of the interest pixel greater than the weight for the other one and performs a weighted addition of the two luminance values.

Further, for each of the four points surrounding the interest pixel in the luminance image, the enlarging unit 27 makes the weight for the lower one of the luminance value of the pixel in the negative-side limiting smoothed image and the luminance value of the interest pixel greater than the weight for the other one and performs a weighted addition of the two luminance values.

For example, the enlarging unit 27 calculates, for each of the four points surrounding the interest pixel of the luminance image, the first reference value $E_{R1}$ and the second reference value $E_{R2}$ in accordance with the following equation:

$$E_{R1}=w_{pl}(E_{pl}-Y)+Y$$

$$E_{R2}=-w_{mi}(E_{mi}-Y)+Y \quad (4)$$

wherein Y is the luminance value of the interest pixel, and $E_{pl}$ and $E_{mi}$ are the luminance value of the positive-side limiting smoothed image and the luminance value of the negative-side limiting smoothed image at interest points of the surrounding four points, respectively. Further, $w_{pl}(E_{pl}-Y)$ is a weighting factor determined based on $(E_{pl}-Y)$. Likewise, $w_{mi}(E_{mi}-Y)$ is a weighting factor determined based on $(E_{mi}-Y)$.

Figure 15A:
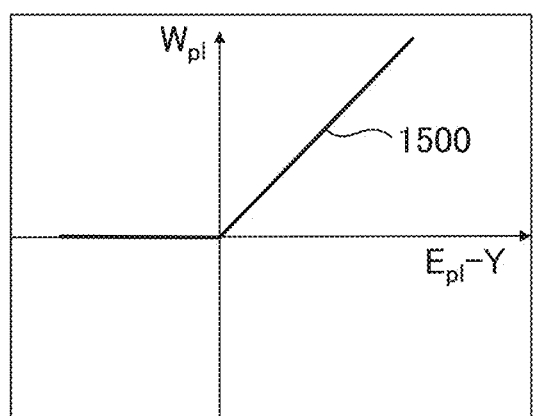
FIG. 15A illustrates an example of a relationship between a difference between a luminance value of a positive-side limiting smoothed image and a luminance value of an interest pixel of a luminance image and a weighting factor.

FIG. 15A illustrates an example of the relationship between the difference $(E_{pl}-Y)$ between the luminance value of the positive-side limiting smoothed image and the luminance value of the interest pixel of the luminance image and the weighting factor $w_{pl}(E_{pl}-Y)$. Further, FIG. 15B illustrates an example of the relationship between the difference $(E_{mi}-Y)$ between the luminance value of the negative-side limiting smoothed image and the luminance value of an interest pixel of the luminance image and a weighting factor $w_{mi}(E_{mi}-Y)$.

In FIG. 15A, the horizontal axis indicates the difference $(E_{pl}-Y)$ between the luminance value of the positive-side limiting smoothed image and the luminance value of the interest pixel of the luminance image, and the vertical axis indicates the weighting factor $w_{pl}(E_{pl}-Y)$. A graph 1500 represents the relationship between the difference $(E_{pl}-Y)$ and the weighting factor $w_{pl}(E_{pl}-Y)$. As represented by the graph 1500, when the difference $(E_{pl}-Y)$ is smaller than or equal to 0, it follows that the weighting factor $w_{pl}(E_{pl}-Y)=0$. Thus, when the difference $(E_{pl}-Y)$ is smaller than or equal to 0, i.e., when $Y \geq E_{pl}$, the first reference value $E_{R1}$ is Y. On the other hand, when the difference $(E_{pl}-Y)$ is greater than 0, i.e., when $E_{pl}>Y$, the gradient of the weighting factor $w_{pl}(E_{pl}-Y)$ with respect to the difference $(E_{pl}-Y)$ is 1, and thus the first reference value $E_{R1}$ is $E_{pl}$. In other words, the first reference value $E_{R1}$ is a value obtained by clipping $E_{pl}$ with Y as the lower limit.

Figure 15B:
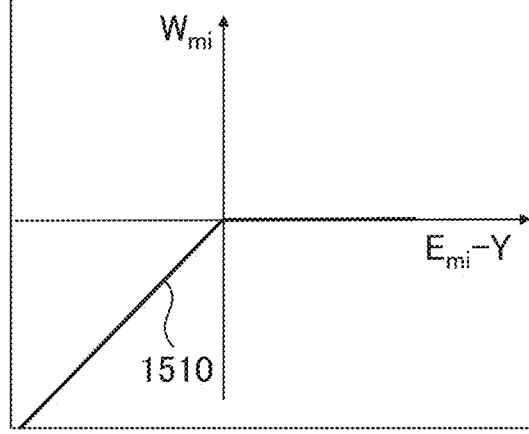
FIG. 15B illustrates an example of a relationship between a difference between a luminance value of a negative-side limiting smoothed image and a luminance value of an interest pixel of a luminance image and a weighting factor.

In FIG. 15B, the horizontal axis indicates the difference $(E_{mi}-Y)$ between the luminance value of the negative-side limiting smoothed image and the luminance value of the interest pixel of the luminance image, and the vertical axis indicates the weighting factor $w_{mi}(E_{mi}-Y)$. A graph 1510 represents the relationship between the difference $(E_{mi}-Y)$ and the weighting factor $w_{mi}(E_{mi}-Y)$. As represented by the graph 1510, when the difference $(E_{mi}-Y)$ is greater than or equal to 0, it follows that the weighting factor $w_{mi}(E_{mi}-Y)=0$. Thus, when the difference $(E_{mi}-Y)$ is greater than or equal to 0, i.e., when $E_{mi} \geq Y$, the second reference value $E_{R2}$ is Y. On the other hand, when the difference $(E_{mi}-Y)$ is smaller than 0, i.e., when $Y>E_{mi}$, the gradient of the weighting factor $w_{mi}(E_{mi}-Y)$ with respect to the difference $(E_{mi}-Y)$ is 1, and thus the second reference value $E_{R2}$ is $E_{mi}$. In other words, the second reference value $E_{R2}$ is a value obtained by clipping $E_{mi}$ with Y as the upper limit.

FIG. 16 is a conceptual diagram of the process for generating an enlarged smoothed image using the positive-side limiting smoothed image and the negative-side limiting smoothed image. In each graph, the horizontal axis indicates the position on the luminance image, and the vertical axis indicates the luminance value. In the left side graph, a profile 1600 represents a profile of a pixel row in the horizontal direction of the luminance image. Further, profiles 1610 and 1620 represent a profile in the positive-side limiting smoothed image and a profile in the negative-side limiting smoothed image of the same pixel row, respectively. As described above, an edge portion 1601 in the original luminance image is included in a range in which the luminance value of the negative-side limiting smoothed image is greater than the luminance value of the positive-side limiting smoothed image.

In the upper side graph at the middle of FIG. 16, a profile 1630 represents a profile of the first reference value for the same pixel row as the profile 1600 and the profile 1610. Meanwhile, in the lower side graph at the middle of FIG. 16, a profile 1640 represents a profile of the second reference value for the same pixel row as the profile 1600 and the profile 1620. It can be seen that the edge portion 1601 is preserved in both the profile 1630 of the first reference value and the profile 1640 of the second reference value.

In the right side graph of FIG. 16, a profile 1650 represents a profile of the luminance value of the enlarged smoothed image as finally obtained, for the same pixel row as the profile 1600, the profile 1630, and the profile 1640. As represented by the profile 1650, it can be seen that the edge portion 1601 in the original luminance image is also preserved in the enlarged smoothed image. Further, it can be seen that except for the edge portion 1601, the enlarged smoothed image is more smoothed than the original luminance image.

According to the modified example, the enlarging unit 27 may generate the enlarged smoothed image using the reduced smoothed image obtained by the smoothing unit 33 instead of using the positive-side limiting smoothed image and the negative-side limiting smoothed image. In this case, the enlarging unit 27 may generate the enlarged smoothed image by performing a process similar to that in the above-described embodiment with respect to the reduced smoothed image.

The enlarging unit 27 outputs the enlarged smoothed image to the correction unit 28.

The correction unit 28 calculates the luminance-corrected image based on the luminance image, the enlarged smoothed image, and the correction factor as in the above-described embodiment or modified example.

Figure 17:
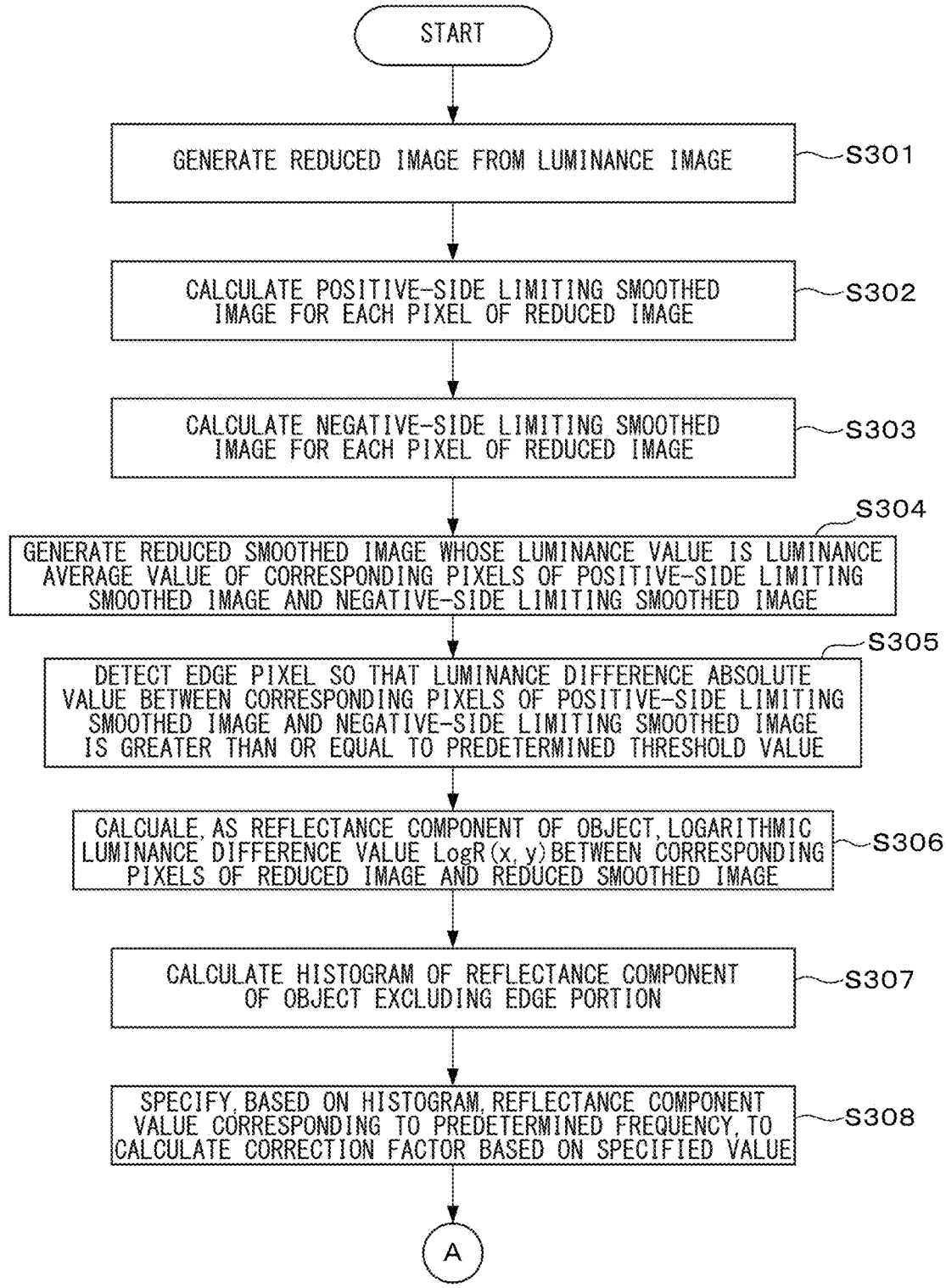
FIG. 17 is an operation flowchart of luminance correction process according to the modified example.
Figure 18:
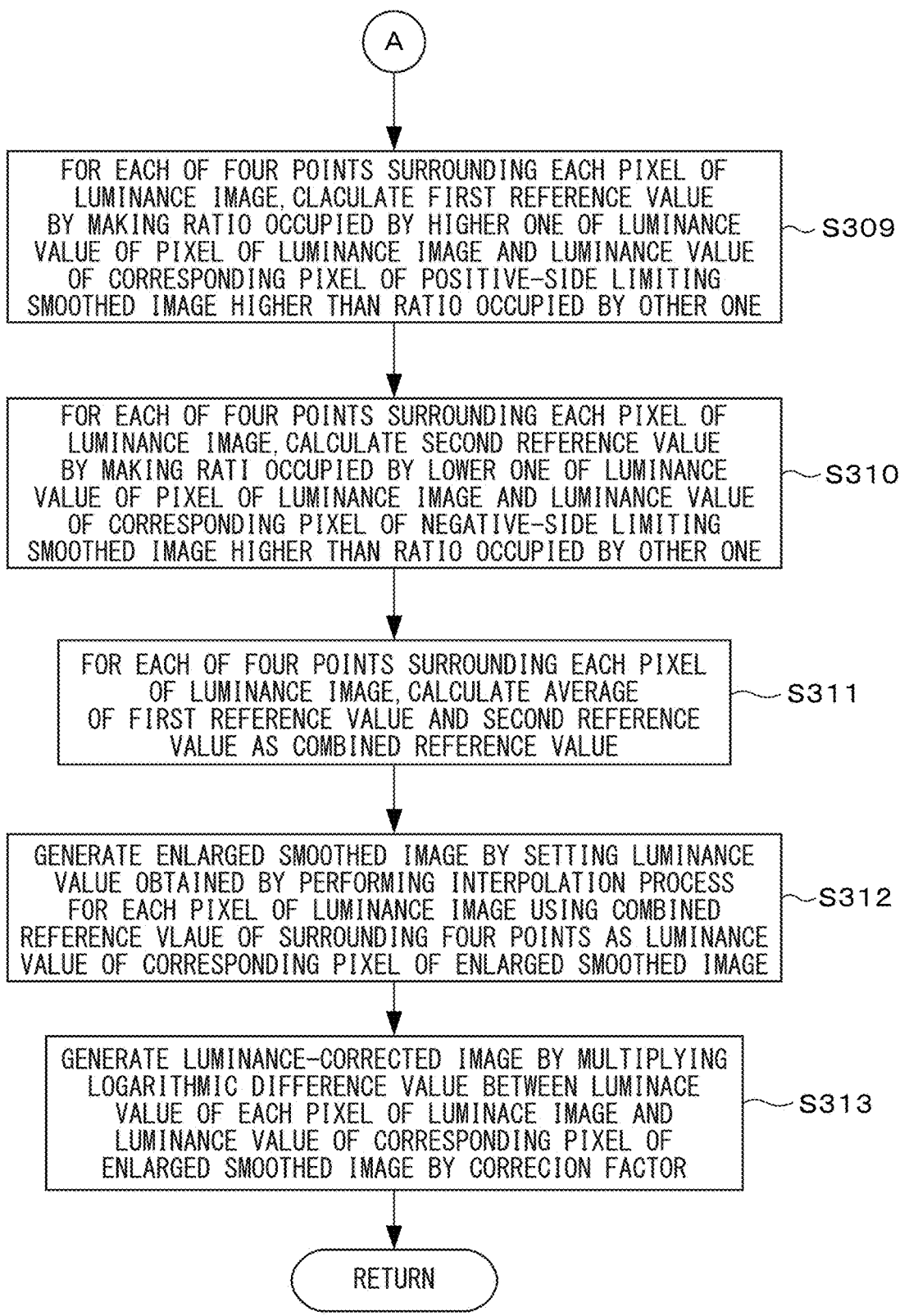
FIG. 18 is an operation flowchart of luminance correction process according to the modified example.

FIGS. 17 and 18 are operation flowcharts of the luminance correction process according to the modified example.

The reduced image generation unit 21 generates a reduced image from the luminance image (step S301).

The positive-side limiting smoothing unit 31 of the reducing/smoothing unit 22 eliminates, for each pixel of the reduced image, the reference pixel so that the difference obtained by subtracting the luminance value of the pixel from the luminance value of the reference pixel is greater than or equal to the predetermined value, among the reference pixels in the filter area. Further, the positive-side limiting smoothing unit 31 calculates, for each pixel of the reduced image, the positive-side limiting smoothed image by performing smoothing using the luminance value of each reference pixel which is not eliminated (step S302). Meanwhile, the negative-side limiting smoothing unit 32 of the reducing/smoothing unit 22 eliminates, for each pixel of the reduced image, the reference pixel so that the difference obtained by subtracting the luminance value of the reference pixel from the luminance value of the pixel is greater than or equal to the predetermined value, among the reference pixels in the filter area. Further, the negative-side limiting smoothing unit 32 calculates, for each pixel of the reduced image, the negative-side limiting smoothed image by performing smoothing using the luminance value of each reference pixel which is not eliminated (step S303).

The smoothing unit 33 of the reducing/smoothing unit 22 generates the reduced smoothed image by calculating, for each pixel of the positive-side limiting smoothed image, an average of the luminance value of the pixel and the luminance value of the corresponding pixel of the negative-side limiting smoothed image as the luminance value of the corresponding pixel of the reduced smoothed image (step S304).

The edge detection unit 23 detects, as the edge pixel, a pixel so that the luminance difference absolute value between the corresponding pixels of the positive-side limiting smoothed image and the negative-side limiting smoothed image is greater than or equal to the predetermined difference threshold value (step S305).

Further, the reduced reflectance component calculation unit 24 calculates, for each pixel of the reduced image, the logarithmic luminance difference value Log R(x,y) between the pixel and the corresponding pixel of the reduced smoothed image as the reflectance component of the object (step S306).

The histogram calculation unit 25 calculates the histogram of the reflectance component of the object excluding the edge portion by calculating the frequency of each value of the reflectance component Log R(x,y) based on the reflectance component Log R(x,y) of the object in each pixel except for the edge pixel of the reduced image (step S307). Then the correction factor calculation unit 26 calculates the correction factor k(Log R(x,y)) having a value corresponding to the value of the reflectance component Log R(x,y) based on the histogram (step S308).

As illustrated in FIG. 18, the enlarging unit 27 specifies, for each pixel of the original luminance image, the pixels of the positive-side limiting smoothed image and the negative-side limiting smoothed image at the surrounding four points. Then, the enlarging unit 27 performs, for each of the surrounding four points, a weighted addition so that the ratio occupied by the higher one of the luminance value of a pixel in the original luminance image and the luminance value of a corresponding pixel in the positive-side limiting smoothed image is greater than that occupied by the other one to calculate the first reference value (step S309). Further, the enlarging unit 27 performs, for each of the surrounding four points, a weighted addition so that the ratio occupied by the lower one of the luminance value of a pixel in the original luminance image and the luminance value of a corresponding pixel in the negative-side limiting smoothed image is greater than that occupied by the other one to calculate the second reference value (step S310).

The enlarging unit 27 calculates, for each pixel of the original luminance image, an average of the first reference value and the second reference value of each of the surrounding four points as a combined reference value of the point (step S311). Further, the enlarging unit 27 sets, for each pixel of the original luminance image, a value obtained by performing an interpolation process using the combined reference value for each of the surrounding four points as the luminance value of the corresponding pixel of an enlarged smoothed image to generate the enlarged smoothed image (step S312).

The correction unit 28 calculates, for each pixel of the original luminance image, the reflectance component Log R(x,y) of the object based on the luminance value I(x,y) of the pixel and the luminance value L(x,y) of the corresponding pixel of the enlarged smoothed image. Then the correction unit 28 generates the luminance-corrected image by emphasizing the reflectance component Log R(x,y) with the correction factor k(Log R(x,y)) corresponding to the value of Log R(x,y) (step S313). Thereupon, the luminance correction unit 12 completes the luminance correction process.

According to the modified example, the luminance correction unit 12 can more accurately detect the edge pixel included in the edge portion of the illuminance distribution of illumination light and thus can reduce the influence of the edge pixel on the correction factor to calculate a more appropriate correction factor. Further, the luminance correction unit 12 can smooth the reflectance component of the object with respect to the enlarged smoothed image while preserving the edge portion of the illuminance distribution of illumination light, and thus can enhance the contrast of the object while suppressing an artifact.

Further, according to another modified example, the edge detection unit 23 may detect the edge pixel using the reduced image instead of the reduced smoothed image. In this case, for example, the edge detection unit 23 calculates the edge strength of each pixel by performing an edge detection filter process with respect to each pixel of the reduced image. Then the edge detection unit 23 may detect, as the edge pixel, a pixel whose edge strength is higher than a predetermined threshold value. However, in this case, in order to prevent the edge pixel from being erroneously detected due to a luminance value change between neighboring pixels caused by the structure of the object, it is preferable that the predetermined threshold value is set to be higher than the threshold value for the edge strength when the edge pixel is detected from the reduced smoothed image.

Further, according to the another modified example, the reduced reflectance component calculation unit 24 may calculate, for each pixel of the reduced image, the ratio R(x,y){=I(x,y)/L(x,y)} of the luminance value I(x,y) for the pixel and the luminance value L(x,y) for the corresponding pixel of the reduced smoothed image as the reflectance component of the object represented in the reduced image. In this case, since the correction factor is also calculated as a value corresponding to R(x,y), the correction unit 28 may calculate, for each pixel of the luminance image, the luminance-corrected image by multiplying R(x,y) by the correction factor.

Further, according to the another modified example, the correction factor calculation unit 26 may determine, instead of the reference values 'a' and 'b', a minimum value min(Log R(x,y)) and a maximum value max(Log R(x,y)) for pixels other than the edge pixels among the reflectance components Log R(x,y) of the object calculated for each pixel of the reduced image. Then the correction factor calculation unit 26 may calculate the correction factor by using the minimum value min(Log R(x,y)) and the maximum value max(Log R(x,y)) instead of the reference values 'a' and 'b' in the equation (1). In this case, since there is no need to create the histogram of the reflectance component of the object, the amount of calculation required to calculate the correction factor is further reduced.

Alternatively, the correction factor calculation unit 26 may calculate a dispersion of the reflectance components of pixels other than the edge pixel among the reflectance components Log R(x,y) of the object calculated for the each pixel of the reduced image. Then the correction factor calculation unit 26 may calculate the correction factor by multiplying a standard correction factor for each value of the preset reflectance components by the ratio of the dispersion to a preset standard dispersion value.

According to a still further modified example, the control unit 6 may perform the process of the luminance correction unit 12 for each of the red, blue and green components of the input image. Alternatively, the image input to the control unit 6 may be a monochrome image having only the luminance component. In these cases, the color conversion unit 11, the chroma correction unit 13 and the inverse color conversion unit 14 may be omitted. Alternatively, the color conversion unit 11 may convert, for each pixel of the original image, the pixel value to a value represented by a color system other than the YUV color system, e.g., the L*a*b* color system. In this instance, the inverse color conversion unit 14 may also convert each pixel value from the color system value converted by the color conversion unit 11 to the RGB color system value. Alternatively, when each pixel value of the corrected image may be represented by a color system other than the RGB color system, the inverse color conversion unit 14 may be omitted.

The function of each unit of the image correction apparatus according to the above-described embodiment or a modified example thereof may be implemented by a computer program which is executed on a processor. Such a computer program may be provided in a form recorded on a computer-readable recording medium such as a magnetic recording medium, an optical recording medium or the like. However, the recording medium does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image correction apparatus comprising:
   a processor configured to:
      generate a reduced image having a smaller number of pixels than an input image;
      generate a reduced smoothed image by smoothing the reduced image;
      detect at least one edge pixel having an edge strength greater than or equal to a predetermined value on the reduced image or the reduced smoothed image;
      calculate, for each pixel of the reduced image, a reflectance component of an object represented in the reduced image based on a ratio of a luminance value of the pixel to a luminance value of a corresponding pixel of the reduced smoothed image;
      calculate a correction factor having a value corresponding to a value of the reflectance component in accordance with a distribution of the reflectance components other than the reflectance component of the at least one edge pixel;
      generate an enlarged smoothed image having the same number of pixels as the input image by enlarging the reduced smoothed image; and
      generate a corrected image by calculating, for each pixel of the corrected image, a luminance value of the each pixel based on the correction factor and the reflectance component corresponding to a ratio of a luminance value of a corresponding pixel of the input image to a luminance value of a corresponding pixel of the enlarged smoothed image.

2. The image correction apparatus according to claim 1, wherein the processor is further configured to calculate a histogram representing a frequency distribution of the reflectance component calculated for each pixel other than the at least one edge pixel in the reduced image, wherein calculation of the correction factor includes calculating the correction factor based on the histogram.

3. The image correction apparatus according to claim 1, wherein the processor is further configured to calculate a histogram representing a frequency distribution of the reflectance component calculated for each pixel of the reduced image by substituting the value of the reflectance component calculated for each of the at least one edge pixel in the reduced image with zero as a value when the luminance value of the each edge pixel and the luminance value of the corresponding pixel of the reduced smoothed image are equal to each other, wherein calculation of the correction factor includes calculating the correction factor based on the histogram.

4. The image correction apparatus according to claim 1, wherein calculation of the reflectance component includes calculating the reflectance component of each pixel of the reduced image after substituting the luminance value of each of the at least one edge pixel in the reduced smoothed image with the luminance value of a corresponding pixel of the reduced image.

5. The image correction apparatus according to claim 1, wherein generation of the reduced smoothed image includes:
   generating a first smoothed image by setting, for each pixel of the reduced image, a filter area including the each pixel and performing smoothing without making reference to a reference pixel, in which a difference obtained by subtracting a luminance value of the pixel from a luminance value of the reference pixel is greater than or equal to a first predetermined value, among a plurality of reference pixels included in the filter area and by using a luminance value of each of other reference pixels of the plurality of reference pixels;
   generating a second smoothed image by setting the filter area for the each pixel of the reduced image and performing smoothing without making reference to a reference pixel, in which the difference obtained by subtracting the luminance value of the reference pixel from the luminance value of the pixel is greater than or equal to a second predetermined value, among the plurality of reference pixels included in the filter area and by using the luminance value of each of other reference pixels of the plurality of reference pixels; and
   generating the reduced smoothed image by calculating an average of the luminance value of the pixel of the first smoothed image and the luminance value of a corresponding pixel of the second smoothed image and setting the average as a luminance value of the corresponding pixel of the reduced smoothed image,
   wherein detection of the edge pixel includes detecting, as the edge pixel, a pixel so that a luminance difference absolute value between corresponding pixels of the first smoothed image and the second smoothed image is greater than or equal to a predetermined threshold value.

6. An image correction method comprising:
   generating a reduced image having a smaller number of pixels than an input image;
   generating a reduced smoothed image by smoothing the reduced image;
   detecting at least one edge pixel having an edge strength greater than or equal to a predetermined value on the reduced image or the reduced smoothed image;
   calculating, for each pixel of the reduced image, a reflectance component of an object represented in the reduced image based on a ratio of a luminance value of the pixel to a luminance value of a corresponding pixel of the reduced smoothed image;
   calculating a correction factor having a value corresponding to a value of the reflectance component in accordance with a distribution of the reflectance components other than the reflectance component of the at least one edge pixel;
   generating an enlarged smoothed image having the same number of pixels as the input image by enlarging the reduced smoothed image; and
   generating a corrected image by calculating, for each pixel of the corrected image, a luminance value of the each pixel based on the correction factor and the reflectance component corresponding to a ratio of a luminance value of a corresponding pixel of the input image to a luminance value of a corresponding pixel of the enlarged smoothed image.

7. The image correction method according to claim 6, further comprising: calculating a histogram representing a frequency distribution of the reflectance component calculated for each pixel other than the at least one edge pixel in the reduced image, wherein
calculation of the correction factor includes calculating the correction factor based on the histogram.

8. The image correction method according to claim 6, further comprising: calculating a histogram representing a frequency distribution of the reflectance component calculated for each pixel of the reduced image by substituting the value of the reflectance component calculated for each of the at least one edge pixel in the reduced image with zero as a value when the luminance value of the each edge pixel and the luminance value of the corresponding pixel of the reduced smoothed image are equal to each other, wherein
calculation of the correction factor includes calculating the correction factor based on the histogram.

9. The image correction method according to claim 6, wherein calculation of the reflectance component includes calculating the reflectance component of each pixel of the reduced image after substituting the luminance value of each of the at least one edge pixel in the reduced smoothed image with the luminance value of a corresponding pixel of the reduced image.

10. The image correction method according to claim 6, wherein generation of the reduced smoothed image includes:
generating a first smoothed image by setting, for each pixel of the reduced image, a filter area including the each pixel and performing smoothing without making reference to a reference pixel, in which a difference obtained by subtracting a luminance value of the pixel from a luminance value of the reference pixel is greater than or equal to a first predetermined value, among a plurality of reference pixels included in the filter area and by using a luminance value of each of other reference pixels of the plurality of reference pixels;
generating a second smoothed image by setting the filter area for the each pixel of the reduced image and performing smoothing without making reference to a reference pixel, in which the difference obtained by subtracting the luminance value of the reference pixel from the luminance value of the pixel is greater than or equal to a second predetermined value, among the plurality of reference pixels included in the filter area and by using the luminance value of each of other reference pixels of the plurality of reference pixels; and
generating the reduced smoothed image by calculating an average of the luminance value of the pixel of the first smoothed image and the luminance value of a corresponding pixel of the second smoothed image and setting the average as a luminance value of the corresponding pixel of the reduced smoothed image,
wherein detection of the edge pixel includes detecting, as the edge pixel, a pixel so that a luminance difference absolute value between corresponding pixels of the first smoothed image and the second smoothed image is greater than or equal to a predetermined threshold value.

11. A non-transitory computer-readable recording medium having recorded thereon a computer program for image correction that causes a computer to execute a process comprising:
generating a reduced image having a smaller number of pixels than an input image;
generating a reduced smoothed image by smoothing the reduced image;
detecting at least one edge pixel having an edge strength greater than or equal to a predetermined value on the reduced image or the reduced smoothed image;
calculating, for each pixel of the reduced image, a reflectance component of an object represented in the reduced image based on a ratio of a luminance value of the pixel to a luminance value of a corresponding pixel of the reduced smoothed image;
calculating a correction factor having a value corresponding to a value of the reflectance component in accordance with a distribution of the reflectance components other than the reflectance component of the at least one edge pixel;
generating an enlarged smoothed image having the same number of pixels as the input image by enlarging the reduced smoothed image; and
generating a corrected image by calculating, for each pixel of the corrected image, a luminance value of the each pixel based on the correction factor and the reflectance component corresponding to a ratio of a luminance value of a corresponding pixel of the input image to a luminance value of a corresponding pixel of the enlarged smoothed image.

* * * * *